United States Patent
Zhu et al.

(10) Patent No.: US 11,190,987 B2
(45) Date of Patent: Nov. 30, 2021

(54) METHOD AND APPARATUS FOR ASSOCIATING APPLICATION WITH NETWORK SLICE, AND COMMUNICATIONS SYSTEM

(71) Applicant: HUAWEI TECHNOLOGIES CO., LTD., Guangdong (CN)

(72) Inventors: Fangyuan Zhu, Beijing (CN); Yan Li, Beijing (CN); Shiyong Tan, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 56 days.

(21) Appl. No.: 16/778,172

(22) Filed: Jan. 31, 2020

(65) Prior Publication Data

US 2020/0169921 A1    May 28, 2020

Related U.S. Application Data

(63) Continuation of application No. PCT/CN2018/090496, filed on Jun. 8, 2018.

(30) Foreign Application Priority Data

Aug. 4, 2017    (CN) .......................... 201710660665.9

(51) Int. Cl.
*H04W 28/26* (2009.01)
*H04W 8/02* (2009.01)
*H04W 16/02* (2009.01)

(52) U.S. Cl.
CPC ............. *H04W 28/26* (2013.01); *H04W 8/02* (2013.01); *H04W 16/02* (2013.01)

(58) Field of Classification Search
CPC ....... H04W 28/26; H04W 8/02; H04W 16/02; H04W 76/11; H04W 4/50; H04W 84/042;
(Continued)

(56) References Cited

U.S. PATENT DOCUMENTS

2010/0022241 A1   1/2010  Hokao
2017/0332421 A1*  11/2017 Sternberg ............ H04W 12/062
(Continued)

FOREIGN PATENT DOCUMENTS

CN     101496435 A     7/2009
CN     106210042 A    12/2016
(Continued)

OTHER PUBLICATIONS

3GPP TR 38.801 V14.0.0 (Mar. 2017), Technical Report 3rd Generation Partnership Project; Technical Specification Group Radio Access Network; Study on new radio access technology: Radio access architecture and interfaces (Release 14) 91 pages.
(Continued)

*Primary Examiner* — Afshawn M Towfighi

(57) ABSTRACT

This application is directed to a method and an apparatus for associating an application with a network slice, and a communications system. The method includes: obtaining, by a terminal, display instruction information, an identifier of a first network slice that the terminal is allowed to access, and service feature information corresponding to the first network slice. The method further includes: displaying the service feature information corresponding to the first network slice on a first display interface of the terminal based on the display instruction information, and generating a first network slice selection policy when detecting an operation of associating a first application with the first display interface. The first network slice selection policy can include a mapping relationship between the first application and the identifier of the first network slice corresponding to the first display interface.

17 Claims, 12 Drawing Sheets

(58) Field of Classification Search
CPC ......... H04W 4/70; H04W 8/26; H04W 28/24; H04W 28/16; H04L 41/0893; H04L 41/5003; H04L 65/1073; H04L 67/141
See application file for complete search history.

(56) References Cited

U.S. PATENT DOCUMENTS

| | | | | |
|---|---|---|---|---|
| 2017/0367036 | A1* | 12/2017 | Chen | ............... H04L 43/08 |
| 2018/0192445 | A1 | 7/2018 | Jiang | |
| 2019/0021047 | A1 | 1/2019 | Zong | |
| 2019/0141606 | A1* | 5/2019 | Qiao | ............... H04W 48/04 |
| 2019/0159029 | A1* | 5/2019 | Li | ............... H04L 29/06 |
| 2019/0312782 | A1* | 10/2019 | Vaishnavi | ........ H04L 41/0893 |

FOREIGN PATENT DOCUMENTS

| | | |
|---|---|---|
| CN | 106375987 A | 2/2017 |
| CN | 106412905 A | 2/2017 |
| CN | 106550410 A | 3/2017 |
| CN | 106572516 A | 4/2017 |
| CN | 106713406 A | 5/2017 |
| CN | 106851589 A | 6/2017 |
| WO | 2017/063708 A1 | 4/2017 |

OTHER PUBLICATIONS

Supplementary European Search Report European Application No. EP 18 84 0698 dated Feb. 25, 2021.
SA WG2 Meeting #S2-122, S2-175219,:"Allowed NSSAI mapping information",Motorola Mobility, Lenovo, Samsung, SK Telecom, Telecom Italia,Jun. 26-30, 2017, San Jose Del Cabo, M xico,total 5 pages.
3GPP TR 23.799 V14.0.0 (Dec. 2016);3rd Generation Partnership Project;Technical Specification Group Services and System Aspects;Study on Architecture for Next Generation System (Release 14);total 522 pages.
3GPP SA WG2 Meeting #120 S2-171981,:"TS 23.502:Update to the SMF selection in PDU Session Establishment procedure",dated Mar. 21, 2017.
International Search Report for PCT/CN2018/090496 dated Aug. 21, 2018, 6 pages.
Motorola Mobility et al,"Solution: Network Slice Selection based on Usage Class",SA WG2 Meeting #115, S2-162327, May 23-27, 2016, Nanjing, P.R. China, total 3 pages.
Notice of Allowance in Chinese Application No. 201710660665.9 dated Sep. 29, 2020.

* cited by examiner

METHOD AND APPARATUS FOR ASSOCIATING APPLICATION WITH NETWORK SLICE, AND COMMUNICATIONS SYSTEM

CROSS-REFERENCE TO RELATED APPLICATIONS

This application is a continuation of International Application No. PCT/CN2018/090496, filed on Jun. 8, 2018, which claims priority to Chinese Patent Application No. 201710660665.9, filed on Aug. 4, 2017. The disclosures of the aforementioned applications are hereby incorporated by reference in their entireties.

TECHNICAL FIELD

This application relates to the field of communications technologies, and in particular, to a method and an apparatus for associating an application with a network slice, and a communications system.

BACKGROUND

In the 5th generation (5G) era, hundreds of billions of internet of things devices access a network, requirements of different types of application scenarios on the network are differentiated, and some of them even conflict with each other. Providing services for different types of application scenarios through a single network at a same time causes an extremely complex network architecture, and low network management efficiency and resource utilization efficiency. In a 5G network slicing technology, network environments isolated from each other are provided for different application scenarios in a manner of virtualizing an independent logical network on a same network infrastructure, so that network functions and characteristics can be customized for the different application scenarios based on respective requirements, and quality of service (QoS) requirements of different services can be practically ensured.

When network slices are deployed on a core network side, and when a terminal initially registers with a network, a network slice selection process is triggered. The terminal has various application types. In the prior art, a network side pre-configures a network slice selection policy (NSSP) for a terminal. The NSSP includes a correspondence between an application and a piece of single network slice selection assistance information (S-NSSAI). When the terminal needs to initiate an application, the terminal adds, according to the NSSP, S-NSSAI corresponding to the application to a registration request. However, a manner in which the network side configures a mapping relationship between an application and a slice type is not flexible enough, and user experience is affected.

SUMMARY

Embodiments of this application provide a method and an apparatus for associating an application with a network slice, and a communications system, to implement configuration of a mapping relationship between an application and a slice type on a terminal side, thereby improving user experience.

Specific technical solutions provided in the embodiments of this application are as follows:

According to a first aspect, an embodiment of this application provides a method for associating an application with a network slice, including: obtaining, by a terminal, display instruction information, an identifier of a first network slice that the terminal is allowed to access, and service feature information corresponding to the first network slice; displaying the service feature information corresponding to the first network slice on a first display interface of the terminal based on the display instruction information; and generating a first network slice selection policy when detecting an operation of associating a first application with the first display interface, where the first network slice selection policy includes a mapping relationship between the first application and the identifier of the first network slice corresponding to the first display interface. Therefore, according to the method provided in this embodiment of this application, an application is associated with a network slice on a terminal side, and an application can be associated with a corresponding network slice based on an association operation self-selected by a user. Configuration performed by a network side is not required, an actual requirement of the user is considered, and flexibility is higher.

In a possible implementation, the obtaining, by a terminal, service feature information corresponding to the first network slice includes: receiving, by the terminal, the service feature information from a network side in a registration process of the terminal. In this implementation, the network side directly delivers the service feature information to the terminal by using signaling. This method is simple and has relatively low complexity.

In a possible implementation, the obtaining, by a terminal, service feature information corresponding to the first network slice includes: receiving, by the terminal, the identifier of the first network slice from a network side in a registration process of the terminal; and obtaining, by the terminal based on a mapping relationship that is between a network slice and service feature information and that is pre-configured by the terminal, and the identifier of the first network slice, the service feature information corresponding to the first network slice. In this implementation, the terminal locally pre-configures the service feature information of the network slice, and obtains, based on an identifier of the network slice sent by the network side, the service feature information corresponding to the network slice. In this way, signaling overheads between the terminal and the network side can be reduced.

In a possible implementation, the method further includes: receiving, by the terminal, the display instruction information from the network side in the registration process of the terminal, where the display instruction information is used to instruct the terminal to display the service feature information corresponding to the first network slice on the first display interface. Because the terminal can display service feature information of a network slice based on display instruction information, the user of the terminal can view service feature information of an accessed network slice at a glance, to help the user select a network slice that provides a service for an application.

In a possible implementation, the method further includes: displaying, by the terminal, the first display interface as an unavailable state when the first network slice cannot provide a service. In this way, when a network slice cannot provide a service for an associated application, the user can clearly and intuitively perceive the unavailable network slice and the associated application.

In a possible implementation, the method further includes: obtaining, by the terminal, an identifier of a second network slice that the terminal is allowed to access and service feature information corresponding to the second network slice; displaying, by the terminal, the service feature information corresponding to the second network slice on a second display interface of the terminal based on the display instruction information; and generating, by the terminal, a second network slice selection policy when detecting an operation of associating the first application with the second display interface, where the second network slice selection policy includes a mapping relationship between the first application and the identifier of the second network slice. According to the foregoing method, the terminal can display service feature information of different network slices by using different display interfaces, so that the user of the terminal can view service feature information of accessed network slices at a glance, to help the user generate corresponding network slice selection policies for applications on the terminal based on the service feature information of the network slices. Therefore, the network side does not need to pre-configure a network slice selection policy for the terminal, thereby saving storage resources of the terminal.

In a possible implementation, the method further includes: displaying, by the terminal after performing registration, slice management information on a third display interface of the terminal, where the third display interface is used by the terminal to perform a management operation on a network slice; and when the terminal accesses the first network slice, the third display interface displays a priority of the first network slice and a resource allocation status of the first network slice. In this implementation, the user can set a priority of each network slice based on a usage status of the network slice, and can set resource allocation rates of different network slices, to implement priority-based resource scheduling for the network slices, and provide differentiated resource configurations.

In a possible implementation, the method further includes: sending, by the terminal, a first session-establishment request message for the first application to the network side, where the first session-establishment request message carries the identifier of the first network slice; and receiving, by the terminal, a session accept message from the network side, where the session accept message includes an identifier of a third network slice and reassociation instruction information, and the reassociation instruction information is used to instruct the terminal to display prompt information prompting to associate the first application with the third network slice. In this implementation, after the user performs a misoperation to incorrectly associate an application with a network slice, and after a session for the application fails to be established, the application is associated with a suggested network slice by using an identifier of the suggested network slice that is returned by the network side, so that the application continues to be used on the suggested network slice, to avoid a problem that the application is unavailable.

In a possible implementation, the session accept message includes a cause value; and the cause value is used to indicate to the terminal that the first application fails to be associated with the first network slice.

According to a second aspect, an embodiment of this application provides a method for associating an application with a network slice, including: receiving, by a network device, a first session-establishment request message for a first application from a terminal, where the first session-establishment request message carries an identifier of a first network slice; determining, by the network device, that the first application fails to be associated with the first network slice; and sending, by the network device, a session accept message to the terminal, where the session accept message includes an identifier of a third network slice and reassociation instruction information, and the reassociation instruction information is used to instruct the terminal to display prompt information prompting to associate the first application with the third network slice. Therefore, according to the method provided in this embodiment of this application, when a session for an application cannot be successfully established, the network device instructs, by using reassociation instruction information, the terminal to associate the application with a suggested network slice, and provides a network service for the application by using the suggested network slice, to avoid a problem that the application is unavailable, thereby improving user experience.

In a possible implementation, after the sending, by the network device, a session accept message to the terminal, the method further includes: receiving, by the network device, a second session-establishment request message sent by the terminal, where the second session-establishment request message carries the identifier of the third network slice. In this implementation, after sending the reassociation instruction information to the terminal, the network device continues to receive the second session-establishment request message sent by the terminal, and provides a service for the first application by using the third network slice.

In a possible implementation, the determining, by the network device, that the first application fails to be associated with the first network slice includes: obtaining, by the network device, subscription information of the terminal after the network device receives the first session-establishment request message, where the subscription information of the terminal does not include the identifier of the first network slice. In this implementation, the network device performs, based on the subscription information of the terminal, subscription check on a network slice that needs to be used by the terminal, to accurately determine whether the first application can be normally used on the network slice that is in the first session-establishment request message.

In a possible implementation, the session accept message includes a cause value; and the cause value is used to indicate to the terminal that the first application fails to be associated with the first network slice.

In a possible implementation, the subscription information of the terminal includes the identifier of the third network slice. Because the subscription information of the terminal includes the identifier of the third network slice, the network device can provide a service for the first application by using the third network slice.

According to a third aspect, an embodiment of this application provides a communications system, including: a mobility management function network element, configured to: receive a first session-establishment request message sent by a terminal for a first application, and send the first session-establishment request message to a session management function network element, where the first session-establishment request message carries an identifier of a first network slice; and the session management function network element, configured to: determine that the first application fails to be associated with the first network slice, and send a first session-establishment request acknowledgement to the mobility management function network element, where the first session-establishment request acknowledgement includes an identifier of a third network slice and reassociation instruction information, and the reassociation instruction information is used to instruct the mobility management function network element to associate the first application with the third network slice, where the mobility management function network element is further configured to send a session accept message to the terminal, where the session accept message includes the identifier of the third network slice and the reassociation instruction information, and the reassociation instruction information is used to instruct the terminal to display prompt information prompting to associate the first application with the third network slice. According to the communications system, when a session or an application cannot be successfully established due to that a user incorrectly associates the application with a network slice, the session management function network element instructs, by using the reassociation instruction information, the mobility management function network element to associate the application with a suggested network slice, and provides a network service for the application by using the suggested network slice, to avoid a problem that the application is unavailable, thereby improving user experience.

According to a fourth aspect, an embodiment of this application provides an apparatus for associating an application with a network slice. The apparatus is applied to a terminal and includes: an obtaining unit, configured to obtain display instruction information, an identifier of a first network slice that the terminal is allowed to access, and service feature information corresponding to the first network slice; a display unit, configured to display the service feature information corresponding to the first network slice on a first display interface of the terminal based on the display instruction information; and a processing unit, configured to generate a first network slice selection policy when an operation of associating a first application with the first display interface is detected, where the first network slice selection policy includes a mapping relationship between the first application and the identifier of the first network slice corresponding to the first display interface.

In a possible implementation, when obtaining the service feature information corresponding to the first network slice, the obtaining unit is specifically configured to: receive the service feature information from a network side in a registration process of the terminal.

In a possible implementation, when obtaining the service feature information corresponding to the first network slice, the obtaining unit is specifically configured to: receive the identifier of the first network slice from a network side in a registration process of the terminal; and obtain, based on a mapping relationship that is between a network slice and service feature information and that is pre-configured by the terminal, and the identifier of the first network slice, the service feature information corresponding to the first network slice.

In a possible implementation, the obtaining unit is further configured to: receive the display instruction information from the network side in the registration process of the terminal, where the display instruction information is used to instruct the display unit to display the service feature information corresponding to the first network slice on the first display interface.

In a possible implementation, the display unit is further configured to: display the first display interface as an unavailable state when the first network slice cannot provide a service.

In a possible implementation, the obtaining unit is further configured to: obtain an identifier of a second network slice that the terminal is allowed to access and service feature information corresponding to the second network slice; the display unit is further configured to display the service feature information corresponding to the second network slice on a second display interface of the terminal based on the display instruction information; and the generation unit is further configured to generate a second network slice selection policy when an operation of associating the first application with the second display interface is detected, where the second network slice selection policy includes a mapping relationship between the first application and the identifier of the second network slice.

In a possible implementation, the display unit is further configured to: display slice management information on a third display interface of the terminal after the terminal performs registration, where the third display interface is used to perform a management operation on a network slice; and when the terminal accesses the first network slice, the third display interface displays a priority of the first network slice and a resource allocation status of the first network slice.

In a possible implementation, the obtaining unit is further configured to: send a first session-establishment request message for the first application to the network side, where the first session-establishment request message carries the identifier of the first network slice; and receive a session accept message from the network side, where the session accept message includes an identifier of a third network slice and reassociation instruction information, and the reassociation instruction information is used to instruct the terminal to display prompt information prompting to associate the first application with the third network slice.

In a possible implementation, the session accept message includes a cause value; and the cause value is used to indicate to the terminal that the first application fails to be associated with the first network slice.

According to a fifth aspect, an embodiment of this application provides an apparatus for associating an application with a network slice. The apparatus is applied to a network device and includes: a receiving unit, configured to receive a first session-establishment request message for a first application from a terminal, where the first session-establishment request message carries an identifier of a first network slice; a processing unit, configured to determine that the first application fails to be associated with the first network slice; and a sending unit, configured to send a session accept message to the terminal, where the session accept message includes an identifier of a third network slice and reassociation instruction information, and the reassociation instruction information is used to instruct the terminal to display prompt information prompting to associate the first application with the third network slice.

In a possible implementation, after the sending unit sends the session accept message to the terminal, the receiving unit is further configured to: receive a second session-establishment request message sent by the terminal, where the second session-establishment request message carries the identifier of the third network slice.

In a possible implementation, when determining that the first application fails to be associated with the first network slice, the processing unit is specifically configured to obtain subscription information of the terminal after the receiving unit receives the first session-establishment request message, where the subscription information of the terminal does not include the identifier of the first network slice.

In a possible implementation, the session accept message includes a cause value; and the cause value is used to indicate to the terminal that the first application fails to be associated with the first network slice.

In a possible implementation, the subscription information of the terminal includes the identifier of the third network slice.

According to a sixth aspect, an embodiment of this application provides a terminal, including a display device, a processor, and a memory. The display device and the memory are separately connected to the processor. The memory is configured to store a program, an instruction, or code, and the processor is configured to execute the program, the instruction, or the code in the memory to complete the method according to any one of the first aspect or the possible implementations of the first aspect.

According to a seventh aspect, an embodiment of this application provides a network device, including a transceiver, a processor, and a memory. The transceiver, the processor, and the memory may be connected by using a bus system. The memory is configured to store a program, an instruction, or code, and the processor is configured to execute the program, the instruction, or the code in the memory to complete the method according to any one of the second aspect or the possible implementations of the second aspect.

According to an eighth aspect, an embodiment of this application provides a computer-readable storage medium, where the computer-readable storage medium stores an instruction, and when the instruction is run on a computer, the computer is enabled to perform the method in the foregoing aspects.

According to a ninth aspect, an embodiment of this application provides a computer program product including an instruction, where when the computer program product is run on a computer, the computer is enabled to perform the method in the foregoing aspects.

According to a tenth aspect, an embodiment of this application provides a chip system, where the chip system includes a processor, configured to support a terminal in implementing functions in the first aspect. In a possible implementation, the chip system further includes a memory, where the memory is configured to store a program instruction and data that are necessary for the terminal. The chip system may include a chip, or may include a chip and another discrete component.

According to an eleventh aspect, an embodiment of this application provides a chip system, where the chip system includes a processor, configured to support a network device in implementing functions in the second aspect. In a possible implementation, the chip system further includes a memory, where the memory is configured to store a program instruction and data that are necessary for the network device. The chip system may include a chip, or may include a chip and another discrete component.

It should be understood that the technical solutions of the fourth aspect to the eleventh aspect of the embodiments of this application are consistent with those of the first aspect and the second aspect of the embodiments of this application, and beneficial effects achieved by the aspects and the corresponding implementable design manners are similar.

DESCRIPTION OF EMBODIMENTS

The following clearly describes the technical solutions in the embodiments of this application with reference to the accompanying drawings in the embodiments of this application.

A method for associating an application with a network slice provided in the embodiments of this application may be applied to a terminal. It should be understood that the terminal in the embodiments of this application may also be referred to as a terminal device, terminal system, a mobile terminal, a mobile station (MS), user equipment (UE), or the like. The terminal may be a device that provides a user with voice and/or data connectivity, a handheld device having a wireless connection function, or another processing device connected to a wireless modem. For example, the terminal may be a mobile phone (or referred to as a "cellular" phone), a computer with a mobile terminal, or the like, or may be a portable, pocket-sized, handheld, computer built-in, or in-vehicle mobile apparatus, or certainly may be a wearable device (such as a smartwatch or a smart band), a tablet computer, a personal computer (PC), a personal digital assistant (PDA), a point of sales (POS), or the like.

Figure 1:
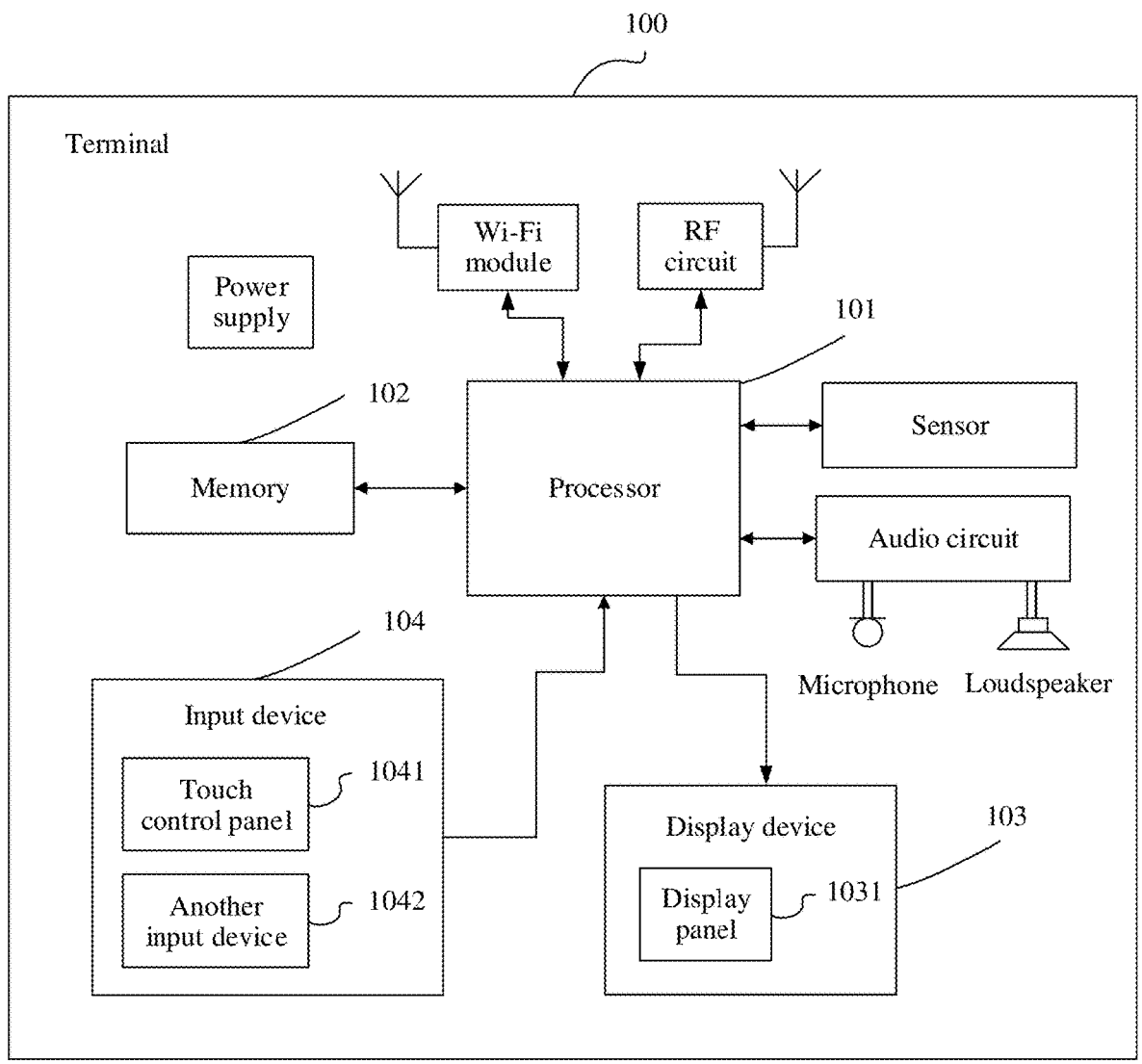
FIG. 1 is a schematic structural diagram of hardware of a terminal according to an embodiment of this application.

FIG. 1 is an optional schematic structural diagram of hardware of a terminal 100 according to an embodiment of this application.

As shown in FIG. 1, an interior of the terminal 100 may include a processor 101, and a memory 102, a display device 103, and an input device 104 that are separately connected to the processor 101. The memory 102 may be configured to store a program and data, including a program of an application installed on the terminal and a network slice selection policy in the embodiments of this application. The processor 101 runs the program stored in the memory 102, to perform various function applications of the terminal 100 and data processing, for example, perform a function of associating an application with a network slice that is performed by the terminal 100.

The following describes in detail the components of the terminal 100 with reference to FIG. 1.

The processor 101 is a control center of the terminal 100, is connected to parts of the entire terminal through various interfaces and lines, and performs various functions of the terminal 100 and processes data by running or executing the program (also referred to as a "module") stored in the memory 102 and invoking the data stored in the memory 102, to perform overall monitoring on the terminal 100.

Optionally, the processor 101 may include at least one processing unit. Optionally, an application processor and a modem processor may be integrated into the processor 101. The application processor mainly processes an operating system, a user interface, an application program, and the like, and the modem processor mainly processes wireless communication. It may be understood that, alternatively, the modem processor may not be integrated into the processor 101.

The memory 102 mainly includes a program storage area and a data storage area. The program storage area may store an operating system (for example, an Android operating system, which is also referred to as an "Android system" for short, where the operating system may also be referred to as a "system" for short), an application program required by at least one function (for example, a sound playing function and an image playing function), the program of the application on the terminal in the embodiments of this application, and the like. The data storage area may store data created based on use of the terminal 100, including the network slice selection policy in the embodiments of this application, related setting information of the application on the terminal, and the like. In addition, the memory 102 may include a high-speed random access memory, or may include a non-volatile memory, such as at least one magnetic disk storage device, a flash storage device, or another volatile solid-state storage device.

The input device 104 may be configured to: receive input digits or character information, and generate an input instruction for key signal input related to user setting and function control of the terminal 100, including an input instruction for selecting, by a user, to associate the application with the network slice on the terminal in the embodiments of this application. Specifically, the input device 104 may include a touch control panel 1041 and another input device 1042. The touch control panel 1041, also referred to as a touchscreen, may collect a touch operation of the user on or near the touch control panel 1041 (such as an operation of the user on the touch control panel 1041 or near the touch control panel 1041 by using any suitable object or accessory such as a finger or a stylus), and drive a corresponding connection apparatus based on a preset program. Optionally, the touch control panel 1041 may include two parts: a touch detection apparatus and a touch controller. The touch detection apparatus detects a touch orientation of the user, detects a touch signal brought by the touch operation, and transmits the touch signal to the touch controller. The touch controller receives the touch signal from the touch detection apparatus, converts the touch signal into contact coordinates, sends the contact coordinates to the processor 101, and can receive a command sent by the processor 101 and execute the command. In addition, the touch control panel 1041 may be implemented as a plurality of types of touch control panels, such as resistive, capacitive, infrared, and surface acoustic touch control panels. The input device 104 may further include the another input device 1042 in addition to the touch control panel 1041. Specifically, the another input device 1042 may include but is not limited to one or more of a physical keyboard, a function key (for example, a volume control key or a power on/off key), a trackball, a mouse, a joystick, and the like.

The display device 103 may be configured to display, by using various display interfaces, information entered by the user or information provided for the user, including service feature information of the network slice associated with the application in the embodiments of this application. For example, the display interfaces include a first display interface, a second display interface, and a third display interface in the embodiments of this application. The display device 103 may include a display panel 1031. Optionally, the display panel 1031 may be configured in a form of a liquid crystal display (LCD), an organic light-emitting diode (OLED), or the like. Further, the touch control panel 1041 may cover the display panel 1031. When detecting the touch operation on or near the touch control panel 1041, the touch control panel 1041 transmits the touch operation to the processor 101 to determine a type of a touch event, and then the processor 101 provides corresponding visual output on the display panel 1031 based on the type of the touch event. Although the touch control panel 1041 and the display panel 1031 in FIG. 1 are used as two independent components to implement input and output functions of the terminal 100, in some embodiments, the touch control panel 1041 and the display panel 1031 may be integrated to implement the input and output functions of the terminal 100.

A person skilled in the art can understand that an internal structure of the terminal 100 shown in FIG. 1 constitutes no limitation on the terminal. The terminal 100 may include more or fewer components than those shown in the figure, or combine some components, or have different component arrangements. For example, the terminal 100 may further include an audio circuit, a loudspeaker, and a microphone that provide an audio interface between the user and the terminal 100. When communicating with an external device in a wireless manner, the terminal 100 may further include a radio frequency (RF) circuit and an antenna connected to the RF circuit, a wireless fidelity (WiFi) module and an antenna connected to the Wi-Fi module, and the like. In addition, the terminal 100 further includes a sensor, a power supply that supplies power to the terminal 100, and the like, which are not enumerated herein.

In this embodiment of this application, the processor 101 obtains, by running the operating system stored in the memory 102 and invoking the program stored in the memory 102, display instruction information, an identifier of a first network slice that the terminal 100 is allowed to access, and service feature information corresponding to the first network slice; the display device 103 displays the service feature information corresponding to the first network slice on the first display interface of the terminal 100 based on the display instruction information; and the processor 101 generates a first network slice selection policy when the input device 104 detects an operation of associating a first application with the first display interface, where the first network slice selection policy includes a mapping relationship between the first application and the identifier of the first network slice corresponding to the first display interface.

The application in the embodiments of this application is an application program installed on the terminal.

Figure 2:
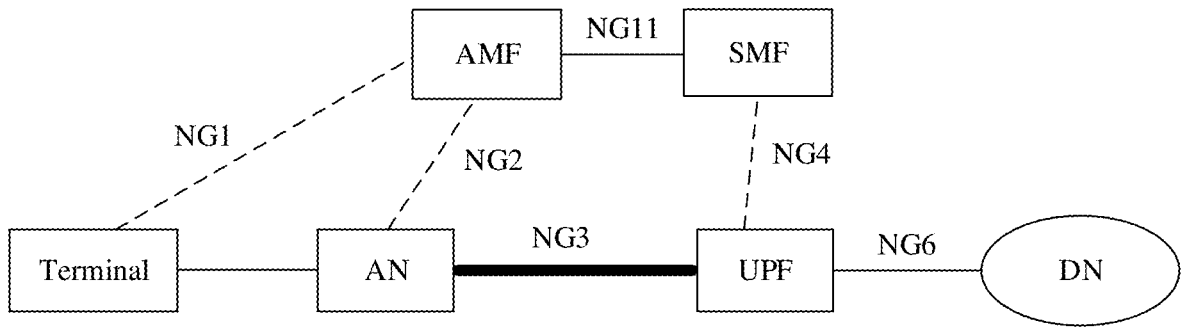
FIG. 2 is a schematic diagram of a next generation mobile network system architecture.

FIG. 2 is a schematic diagram of a next generation mobile network system architecture. In the next generation mobile network architecture, a control plane (CP) is separated from a forwarding plane (which may also be referred to as a user plane, or a UP), for example, a control plane function of a mobile gateway is decoupled from a forwarding plane function; and a unified control plane network element is divided into a session management function (SMF) entity and an access and mobility management function (AMF) entity.

For example, the system architecture includes: a terminal (e.g., the terminal 100 shown in FIG. 1), an access network (AN), a data network (DN), an SMF, an AMF, and a user plane function (UPF) entity. When the terminal is in an active state, there is an NG1 signaling connection between the AMF and the terminal. A wireless connection exists between the terminal and the AN. The wireless connection includes a radio resource control (RRC) signaling connection and a user plane connection, and the user plane connection may be a radio bearer (RB). There is an NG2 signaling connection between the AMF and the AN. There is an NG3 signaling connection between the AN and the UPF. There is an NG4 signaling connection between the SMF and the UPF. There is an NG6 signaling connection between the UPF and the DN. There is an NG11 signaling connection between the AMF and the SMF.

The AMF is responsible for attachment, mobility management, a tracking area update procedure, and the like of the terminal.

The SMF is responsible for session management of the terminal, UPF selection, UPF reselection, and internet protocol (IP) address allocation, and is responsible for session establishment, modification, and release, QoS control, and the like.

The AN provides a wireless access service for the terminal. The AN may include various forms of base stations such as a macro base station, a micro base station (also referred to as a small cell), a relay station, or an access point. In systems using different wireless access technologies, names of a device having a function of the base station may be different. For example, in an LTE system, the device is referred to as an evolved NodeB (eNB or eNodeB), in a 3rd generation (3G) system, the device is referred to as a NodeB, and in a 5G system, the device is referred to as a new base station (gNodeB, gNB). This is not limited in the embodiments of this application.

The DN may be used to provide a data transmission service for the terminal.

The terminal includes but is not limited to a mobile phone, a network access terminal device, an internet of things terminal device, and the like, and may be configured as the terminal 100 shown in FIG. 1.

Figure 3:
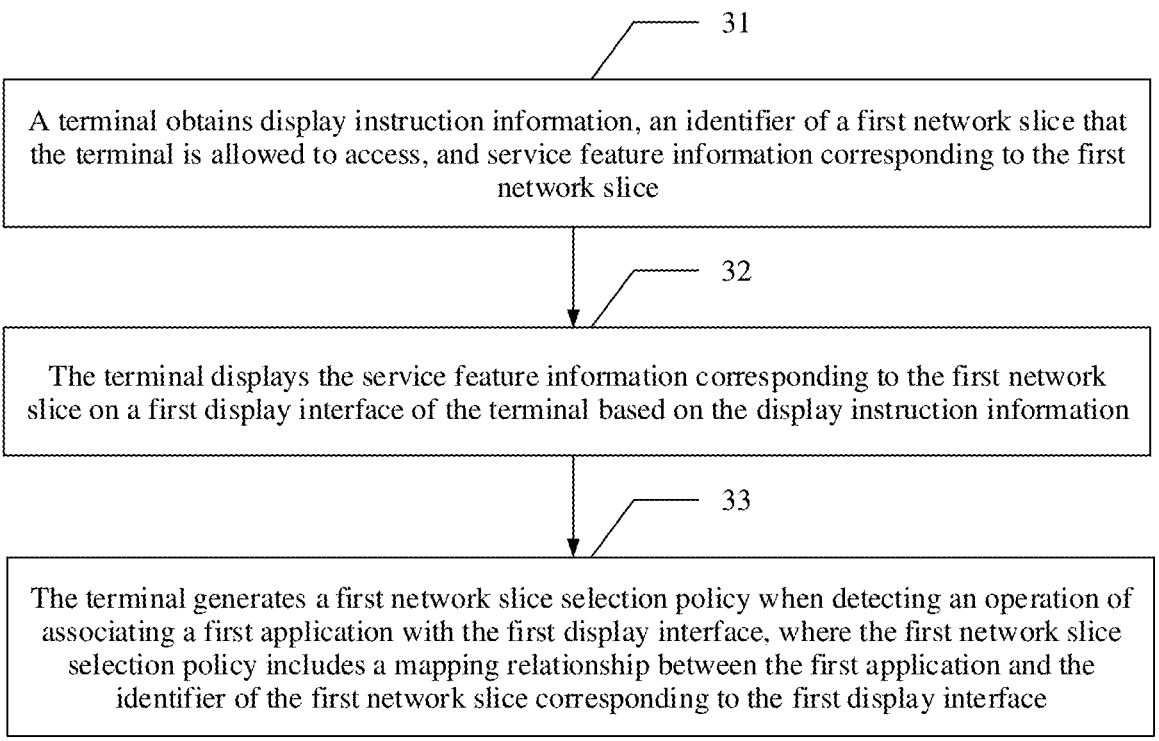
FIG. 3 is a flowchart of a method for associating an application with a network slice according to an embodiment of this application.

Based on the schematic diagram of the network system architecture shown in FIG. 2, FIG. 3 is a schematic diagram of a procedure of a method for associating an application with a network slice according to an embodiment of this application. The procedure may be specifically implemented by using hardware, software programming, or a combination of software and hardware.

The terminal 100 shown in FIG. 1 may be configured to execute the procedure shown in FIG. 3. As shown in FIG. 3, the procedure specifically includes the following processing process.

Step 31: The terminal obtains display instruction information, an identifier of a first network slice that the terminal is allowed to access, and service feature information corresponding to the first network slice.

It should be noted that the display instruction information in this embodiment of this application is used to instruct the terminal to perform split-screen display, for network slices of different slice types, on service feature information corresponding to the network slices. Optionally, displayed service feature information may include information such as a network speed, a charging criterion, and a service provider that are corresponding to a network slice. In addition, the service feature information may further display other service feature information related to the network slice, and this is not limited in this application.

For example, in step 31, when the terminal obtains the service feature information corresponding to the first network slice, the following two implementations may be used but are not limited thereto.

First implementation: The terminal receives the service feature information corresponding to the first network slice from a network side in a registration process of the terminal.

For example, the terminal receives, in the process in which the terminal registers with a network, the service feature information corresponding to the first network slice and the display instruction information that are returned by the network side in a registration accept message by using non-access stratum (NAS) signaling.

Second implementation: The terminal receives the identifier of the first network slice from a network side in a registration process of the terminal; and the terminal obtains, based on a mapping relationship that is between a network slice and service feature information and that is pre-configured by the terminal, and the identifier of the first network slice, the service feature information corresponding to the first network slice.

For example, the terminal pre-configures a network slice supported in a public land mobile network (PLMN) and corresponding service feature information. When initially registering with a network, the terminal receives the identifier of the first network slice and the display instruction information that are returned by the network side. The terminal obtains, based on the identifier of the first network slice and the mapping relationship that is between a network slice and service feature information and that is pre-configured by the terminal, the service feature information corresponding to the first network slice.

It should be noted that the terminal may obtain the display instruction information from the network side in any one of the foregoing two implementations.

Step 32: The terminal displays the service feature information corresponding to the first network slice on a first display interface of the terminal based on the display instruction information.

Step 33: The terminal generates a first network slice selection policy when detecting an operation of associating a first application with the first display interface, where the first network slice selection policy includes a mapping relationship between the first application and the identifier of the first network slice corresponding to the first display interface.

It should be noted that the operation of associating an application with a display interface in this application may be: after a user downloads and installs the application, when the application is used, the application is dragged to the display interface, that is, the application is associated with an identifier of a network slice corresponding to the display interface; or optionally, after the application is downloaded, in an installation process, the terminal prompts a user whether to associate the application with an identifier of a network slice corresponding to the display interface, and after the user enters, by using a display device of the terminal, a determining instruction for associating the identifier of the network slice, the terminal associates the identifier of the network slice with the application.

It should be noted that the operation of associating the application with the display interface may be implemented in any one of the foregoing two implementations. After the operation of associating the application with the display interface is completed, the terminal generates a network slice selection policy. The network slice selection policy includes a mapping relationship between the application and the identifier of the network slice corresponding to the display interface.

It should be noted that the first network slice is any one of network slices that the terminal is allowed to access.

In the prior art, a terminal implements a mapping relationship between an application and an identifier of a network slice by configuring a network slice selection policy. However, a method for configuring the network slice selection policy is not flexible enough. An application developer is required to negotiate with an operator when designing an application, and the operator determines a specific slice type that should provide a service for specific applications. In addition, a configured NSSP on the terminal includes all application types on a current application market, and this causes an extremely long application list. However, a limited quantity of applications are actually used by the terminal. Consequently, storage resources of the terminal are wasted.

It can be learned from the foregoing technical solution that the terminal can display service feature information corresponding to a network slice that the terminal is allowed to access on a user interface of the terminal based on display instruction information, and when detecting an operation of associating any application with a corresponding display interface, the terminal generates a mapping relationship between the application and an identifier of a network slice corresponding to the corresponding display interface. In this manner of associating an application with a network slice on a terminal side, the application can be associated with the corresponding network slice based on an association operation self-selected by a user. Therefore, configuration performed by a network side is not required, an actual requirement of the user is considered, and flexibility is higher.

Optionally, in this embodiment of this application, after the terminal detects the operation of associating the first application with the first display interface and generates the first network slice selection policy, when the first network slice cannot provide a service for the terminal due to that the terminal moves out of a service area of the first network slice, the terminal displays the first display interface as an unavailable state.

Further, when the first network slice cannot provide a service for the terminal due to mobility of the terminal, the terminal obtains an identifier of a second network slice that the terminal is allowed to access, display instruction information, and service feature information corresponding to the second network slice at a current location; the terminal displays the service feature information corresponding to the second network slice on a second display interface of the terminal based on the display instruction information; and when detecting an operation of associating the first application with the second display interface, the terminal generates a second network slice selection policy, where the second network slice selection policy includes a mapping relationship between the first application and the identifier of the second network slice. In this way, the first application is associated with the second network slice, so that a network service can be provided for the first application by using the second network slice, and a problem that the first application is interrupted or cannot be normally used in a use process due to that the first network slice cannot provide a service is avoided.

Further, after registering with the network, the terminal displays slice management information on a third display interface of the terminal, where the third display interface is used by the terminal to perform a management operation on a network slice that the terminal is allowed to access. For example, when the terminal accesses the first network slice, the third display interface displays a priority of the first network slice, and a resource allocation status of the first network slice.

It should be noted that in this application, different display interfaces are displayed on different split screens, and application programs on the different split screens may simultaneously run without affecting each other. In this case, one split screen is corresponding to one display interface, and a user may perform switching by sliding leftward or rightward, to browse a corresponding display interface.

With reference to actual application scenarios, the following first describes a specific implementation process of associating an application with a network slice that is provided in this embodiment of this application.

Application Scenario 1

The terminal initiates a registration request, and receives a registration accept message from the network side. The registration accept message includes an identifier of a network slice that the terminal is allowed to access, service feature information of the network slice corresponding to the identifier of the network slice, and display instruction information that are returned by the network side. The terminal respectively displays service feature information of different network slices on a plurality of display interfaces based on the display instruction information, so that a user associates, based on a use requirement of the user for an application and the service feature information of the network slices, the application with a network slice that the user tends to access, that is, associates the application with an identifier that is of the network slice and that is corresponding to the network slice that the user tends to access. The terminal generates a network slice selection policy based on an association relationship between the application and the identifier of the network slice. For a specific procedure, refer to FIG. 4.

Step 41: The terminal receives, in a registration process of the terminal, a type of a slice that the terminal is allowed to access (allowed-NSSAI), service feature information corresponding to each slice type, and display instruction information that are returned by a network side by using a registration accept message.

The type of the slice that the terminal is allowed to access includes at least one piece of single network slice selection assistance information (S-NSSAI).

It should be noted that the display instruction information is used to instruct an operating system of the terminal to control to perform split-screen display, on a user interface (UI), on service feature information of different slice types that can be provided by the network side in a PLMN in which the terminal is currently located.

It should be noted that a UI is a medium for exchanging information between an operating system of a terminal and a user. The UI is displayed on a display device of the terminal. The terminal receives an input operation of the user by using the display device, responds to an event generated by the input operation, and invokes a corresponding event processing function to process the event.

Using an example for description, in the registration process of the terminal, the terminal receives the registration accept message returned by the network side, and the registration accept message carries allowed-NSSAI and service feature information corresponding to each slice type. Table 1 shows a slice type and corresponding service feature information that are returned by the network side. The allowed-NSSAI herein includes three slice types, and the three network slices are identified by using S-NSSAI-1, S-NSSAI-2, and S-NSSAI-3 respectively. The service feature information returned by the network side includes either or both of a service provider of the network slice and network speed information of the network slice. It should be noted that the service provider of the network slice may be an operator to which the network slice belongs, or may be a tenant or an enterprise network to which the network slice belongs. Optionally, the network speed information of the network slice may be represented by "high", "medium", or "low", or in another representation form. Alternatively, a maximum bandwidth that can be provided by the network slice may be used for representation, or another representation form that can be directly understood by the user may be used for representation. This is not specifically limited in this application. Certainly, the service feature information may further include other information related to the network slice, and this is not specifically limited in this application. For example, refer to Table 1.

TABLE 1

| allowed-NSSAI | Service feature information |
| --- | --- |
| S-NSSAI-1 | China Mobile-high network speed |
| S-NSSAI-2 | China Mobile-medium network speed |
| S-NSSAI-3 | For internal use of Huawei only |

Step 42: The terminal performs split-screen display on service feature information of different network slices on different display interfaces based on the display instruction information.

Figure 5:
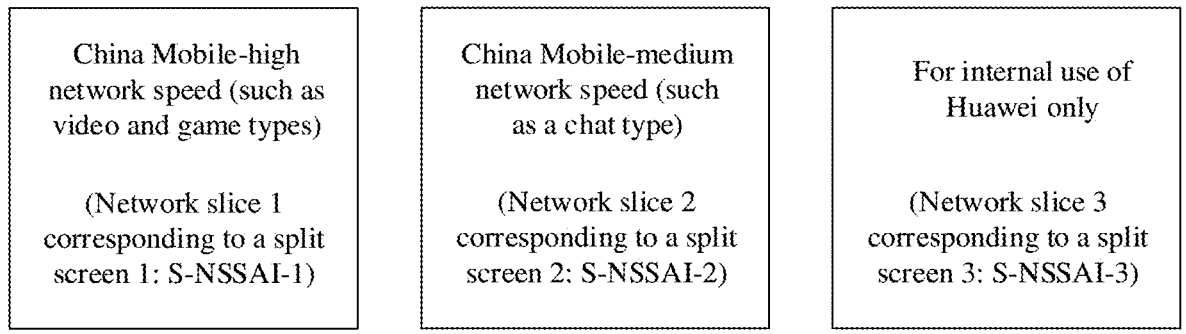
FIG. 5 is a schematic diagram of display of service feature information of different network slices according to an embodiment of this application.

Specifically, as shown in FIG. 5, the terminal displays service feature information of the S-NSSAI-1 on the first display interface, displays service feature information of the S-NSSAI-2 on the second display interface, and displays service feature information of the S-NSSAI-3 on the third display interface.

Specifically, the foregoing three display interfaces may occupy three split screens respectively, each split screen is corresponding to a display interface, and a user may slide each split screen leftward or rightward to browse a corresponding display interface.

For example, when the user sees, on the user interface, the service feature information of the S-NSSAI-1 that is displayed on the first display interface, the user may associate, based on a preference of the user and a requirement on a network speed, an application of video and game types frequently used by the user with the identifier of the first network slice corresponding to the first display interface, thereby achieving good user experience. Alternatively, when the user receives service feature information that corresponds to the network slice and that is returned by the network side, the service feature information further includes character string prompt information, for example, "such as video and game types". The terminal further displays the character string prompt information on the display interface, to help the user associate an application with an identifier of the network slice.

Similarly, a method for displaying "such as a chat type" displayed on the second display interface in FIG. 5 is similar to that in the foregoing description, and details are not described herein again.

Step 43: When detecting an installation operation performed by the user on an application (APP), the terminal displays, on a display interface of the terminal, prompt information prompting to associate a network slice.

Figure 6:
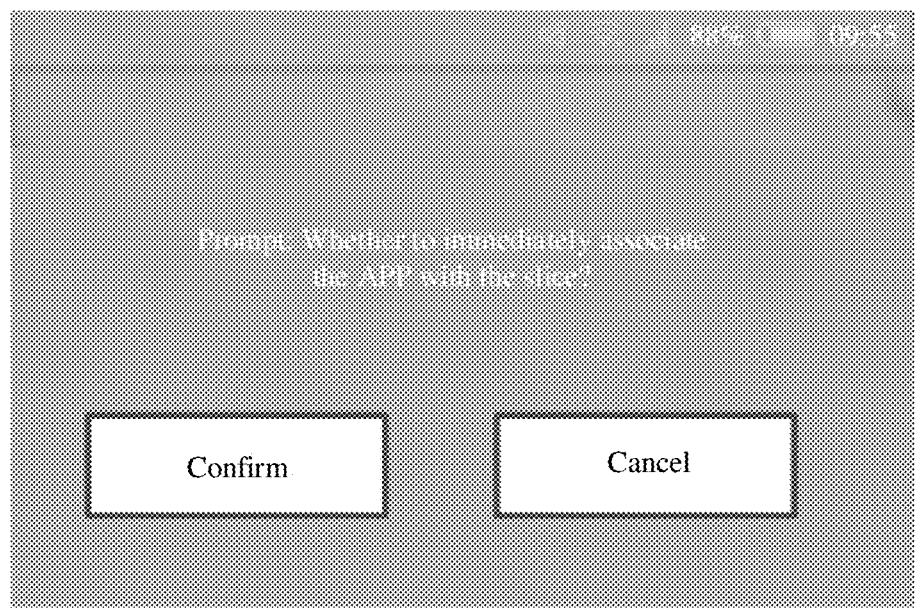
FIG. 6 is a schematic diagram of display of prompt information prompting to associate a network slice according to an embodiment of this application.

FIG. 6 is a schematic diagram of display of prompt information prompting to associate a network slice. To be specific, the prompt information of "whether to immediately associate the APP with the slice", and an input instruction that can be selected by a user, that is, confirm or cancel, are displayed on a user interface of a terminal.

Step 44: The terminal generates a network slice selection policy based on an instruction entered by the user for the prompt information, where the network slice selection policy includes a mapping relationship between the application and an identifier of the network slice.

Specifically, the following two cases may be included.

In a first case, if the user enters, by using a display device of the terminal, a confirmation instruction for associating the APP with a network slice, and drags an icon of the APP to a display interface corresponding to a specific network slice, the terminal generates a mapping relationship between the APP and an identifier of the network slice.

Figure 7A:
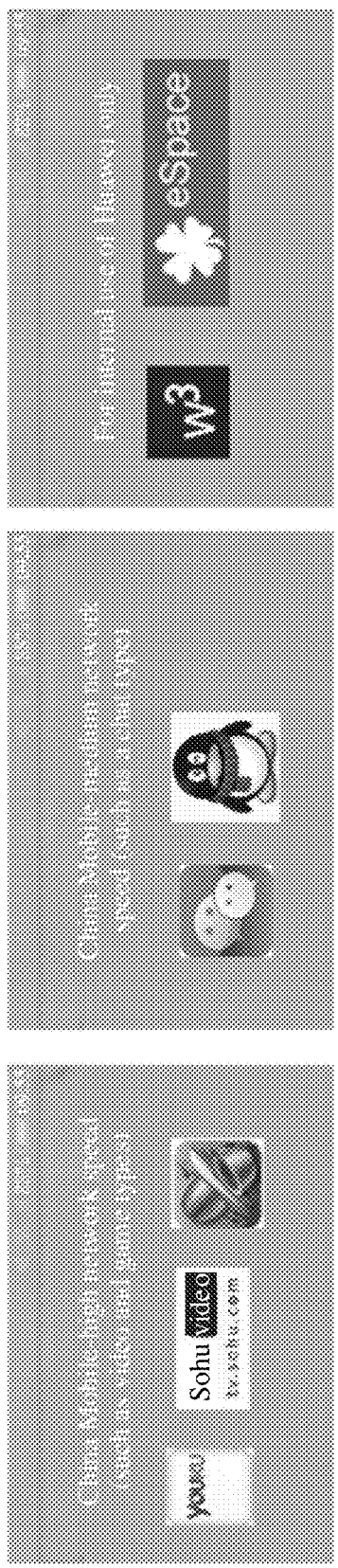
FIG. 7A and FIG. 7B are a schematic diagram of associating an application with a network slice according to an embodiment of this application.

For example, as shown in FIG. 7A, after the terminal performs registration, the terminal performs split-screen display, based on the method described in step 41 and step 42, on service feature information corresponding to different network slices that can be accessed by the terminal in a current location. In a process of installing downloaded applications (for example, Youku video, Sohu video, and Fruit Ninja) by the user or after the installation, to obtain better service experience, the user tends to use the video type or game type application by using a network slice corresponding to a split screen that displays "high network speed", and drags the applications to the display interface corresponding to the S-NSSAI-1, that is, associates the three applications: Youku video, Sohu video, and Fruit Ninja with the network slice corresponding to the S-NSSAI-1. The terminal generates a network slice selection policy for the three applications: Youku video, Sohu video, and Fruit Ninja, and the network slice selection policy includes a mapping relationship between the three applications and the S-NSSAI-1.

In addition, in a process of installing, downloaded applications (such as WeChat and QQ) by the user or after the installation, to obtain better service experience, the user tends to use the chat type applications by using a network slice corresponding to a split screen that displays "medium network speed", and drags the applications to the display interface corresponding to the S-NSSAI-2, that is, associates the two applications: WeChat and QQ with the network slice corresponding to the S-NSSAI-2. The terminal generates a network slice selection policy for the two applications:

WeChat and QQ, and the network slice selection policy includes a mapping relationship between the two applications and the S-NSSAI-2.

In addition, the user is an employee of Huawei, and the current location of the terminal is in an office area of Huawei. In a process of installing, by the user, downloaded enterprise applications: W3 and ESPACE that are used by only internal employees of Huawei or after the installation, to ensure that commercial information is not leaked, the user tends to use the enterprise applications by using a network slice corresponding to a split screen that displays "for internal use of Huawei only", and drags the applications to the network slice corresponding to the S-NSSAI-3, that is, associates the two applications: W3 and ESPACE with the network slice corresponding to the S-NSSAI-3. The terminal generates a network slice selection policy for the two applications: W3 and ESPACE, and the network slice selection policy includes a mapping relationship between the two applications and the S-NSSAI-3.

It should be stated that, because the S-NSSAI-3 is corresponding to the network slice corresponding to "for internal use of Huawei only", the network slice is available only when the terminal is within a service range of the network slice. For example, the service range may be an office campus, an office building, or the like. In addition, in a possible implementation, the applications limited to be used by only the internal employees of Huawei, for example, W3 and ESPACE, may alternatively be associated with a network slice corresponding to another split screen. This is not specifically limited in this application.

In a possible implementation, a mapping relationship between an application and a slice type may be represented in the network slice selection policy by using a mapping table, as shown in Table 2. Certainly, the mapping relationship between the application and the slice type may alternatively be represented in another representation manner. This is not specifically limited in this application.

TABLE 2

| | |
|---|---|
| Youku video | S-NSSAI-1 |
| Sohu video | S-NSSAI-1 |
| QQ | S-NSSAI-2 |
| WeChat | S-NSSAI-2 |
| ESPACE | S-NSSAI-3 |
| W3 | S-NSSAI-3 |

In a second case, if the user enters, by using a display device of the terminal, a cancellation instruction for associating the APP with a network slice, the terminal associates the APP with a network slice corresponding to default S-NSSAI.

It should be noted that the default S-NSSAI may be any slice type in the allowed-NSSAI. When the terminal detects that the APP is started for the first time after the installation is completed, the user may drag an icon of the APP to an appropriate location to associate the APP with an actually used slice type.

Figure 7B:
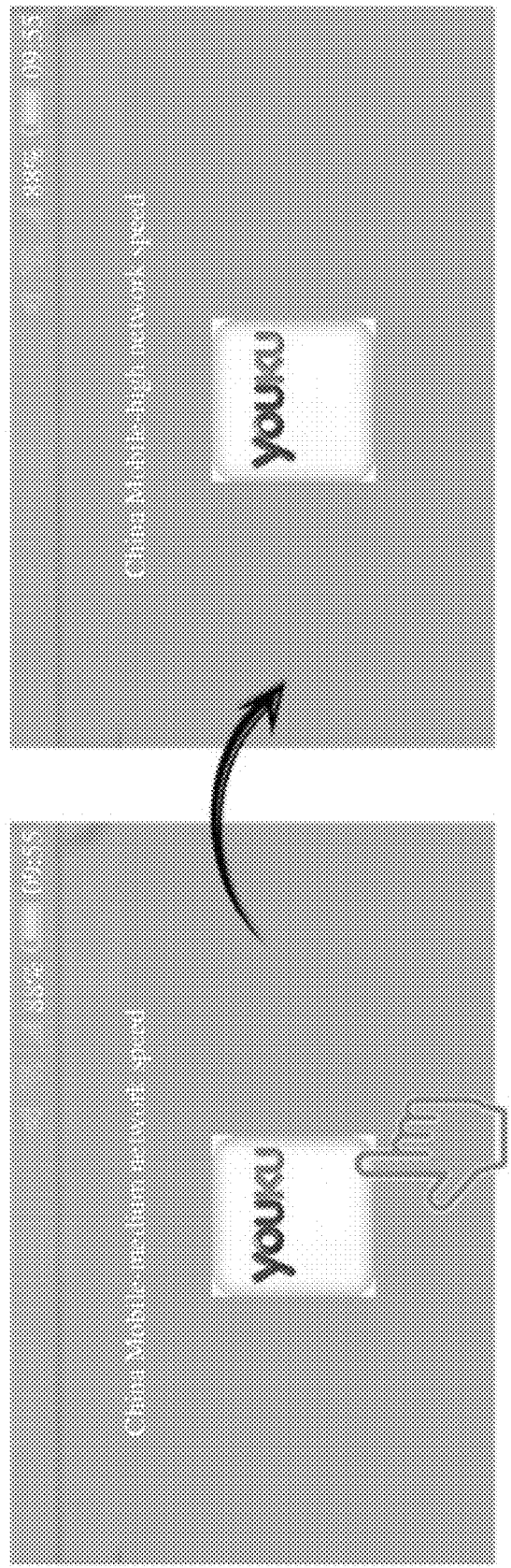

For example, as shown in FIG. 7B, after the user downloads the application Youku video, if the user does not immediately use the application, the user may associate the application Youku video with a slice type corresponding to the default S-NSSAI. When the user uses the application for the first time, the user moves, by dragging an icon of the application, the application from a display interface corresponding to the previous default S-NSSAI to a display interface corresponding to a slice type that the user tends to use.

In application scenario 1, the terminal may clearly explicitly display service feature information, such as charging criteria and network speed information, of different network slices, so that the user can view a currently accessed network slice at a glance, and the terminal can conveniently autonomously generate a network slice selection policy that includes a mapping relationship between each application and a network slice identifier. Therefore, the user can independently select a network slice used by an application, thereby improving use experience of the user for the application, and implementing friendly interaction between the user and the terminal.

Application Scenario 2

Figure 8:
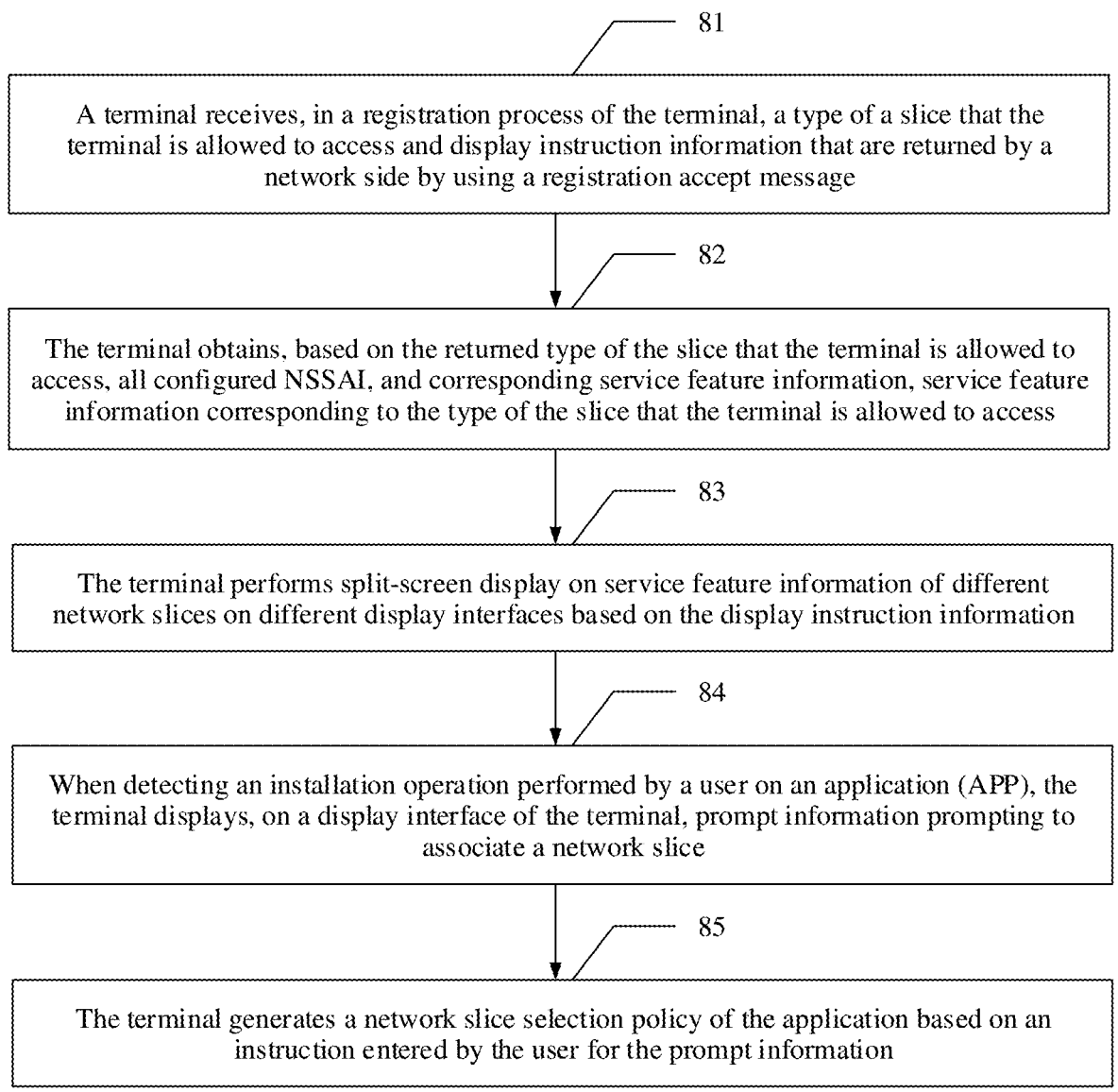
FIG. 8 is a flowchart of a method for associating an application with a network slice in an application scenario 2 according to an embodiment of this application.

The terminal initiates a registration request, and receives, in a registration accept message, an identifier of a network slice that the terminal is allowed to access and display instruction information that are returned by the network side. The terminal sifts out, from correspondences between identifiers of pre-configured network slices and service feature information, the service feature information corresponding to the network slice that the terminal is allowed to access. Further, the terminal respectively displays service feature information of different network slices on a plurality of display interfaces based on the display instruction information, so that a user associates, based on a use requirement of the user for the application and service feature information of the network slice, an application with a network slice that the user tends to access, that is, associates the application with an identifier that is of the network slice and that is corresponding to the network slice that the user tends to access. The terminal generates a network slice selection policy based on an association relationship between the application and the identifier of the network slice. For a specific procedure, refer to FIG. 8.

It should be noted that, in the application scenario 2, the terminal needs to pre-configure an identifier of a network slice supported in a PLMN and corresponding service feature information. For specific pre-configured information, refer to Table 3.

TABLE 3

| Service feature information corresponding to a slice type configured by a terminal | |
|---|---|
| S-NSSAI-1 | Service feature information 1 |
| S-NSSAI-2 | Service feature information 2 |
| S-NSSAI-3 | Service feature information 3 |
| . . . | . . . |
| S-NSSAI-n | Service feature information n |

Step 81: The terminal receives, in a registration process of the terminal, a type of a slice that the terminal is allowed to access (allowed-NSSAI) and display instruction information that are returned by a network side by using a registration accept message.

The type of the slice that the terminal is allowed to access includes at least one piece of S-NSSAI.

Step 82: The terminal obtains, based on the returned allowed-NSSAI, identifiers of configured network slices, and corresponding service feature information, service feature information corresponding to the allowed-NSSAI.

Figure 4:
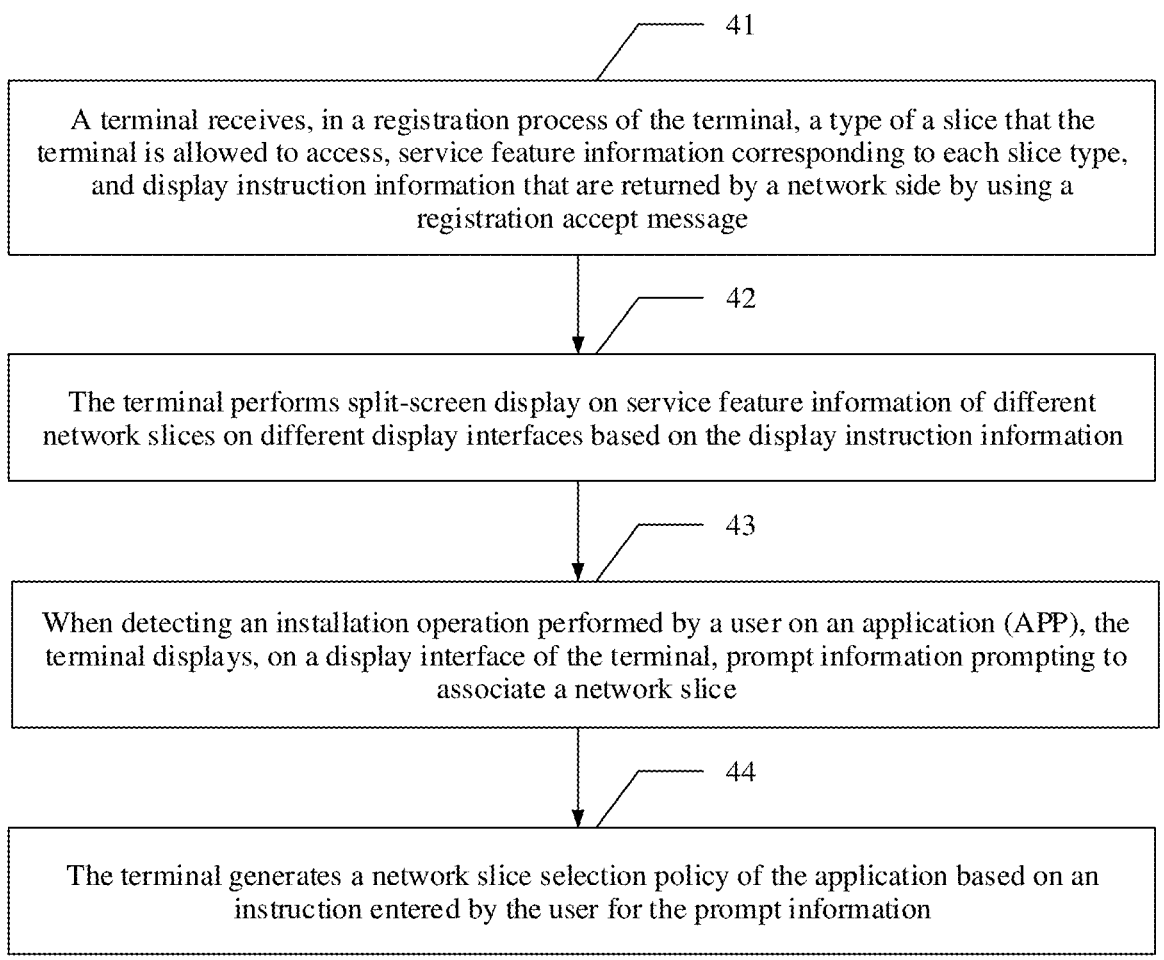
FIG. 4 is a flowchart of a method for associating an application with a network slice in an application scenario 1 according to an embodiment of this application.

Step 83 to step 85 are consistent with step 42 to step 44 in FIG. 4, and details are not described herein again.

Application Scenario 3

The terminal generates, by using the method in the application scenario 1 or the application scenario 2, a network slice selection policy including a mapping relationship between each application and a network slice identifier.

When a network slice associated with a specific application on the terminal cannot provide a service, the network side triggers the terminal to update a locally stored network slice selection policy. For example, the terminal moves out of a service range of a network slice, in other words, the terminal cannot access the network slice in a new location area. Therefore, in a moving scenario, after a location area of the terminal is updated, the network side returns an identifier of a network slice that can be supported in a PLMN in a current latest location area, and triggers the terminal to update a locally stored mapping relationship between an application and the identifier of the network slice.

In this case, the terminal displays, on a display interface of the network slice, an application associated with the network slice that cannot provide a service in the current network, in a special state different from a normal working state. Optionally, prompt information prompting that the application is unavailable may be further displayed on the corresponding display interface.

In an actual application, a scenario in which after leaving a service range of a network slice, a user cannot use an application associated with the network slice greatly limits mobility of the user, and the scenario may be used as a special scenario in which trade secrets, national information security, or the like needs to be protected.

Figure 9:
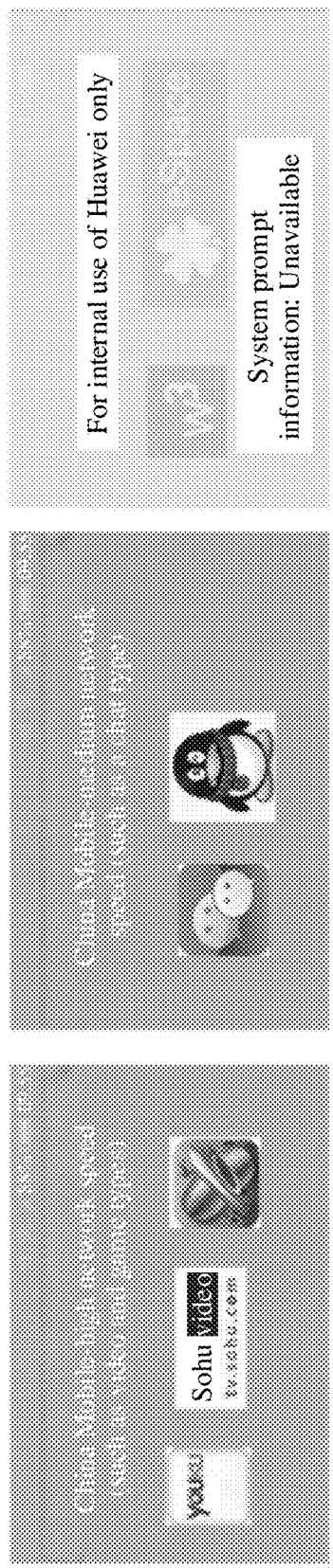
FIG. 9 is a schematic diagram of display of a case in which a network slice associated with an application cannot provide a service in an application scenario 3 according to an embodiment of this application.

FIG. 9 is a specific schematic diagram. For example, in consideration of security, some applications of an enterprise, such as the applications: W3 and ESPACE in FIG. 9, may be possibly used only on a network slice corresponding to a network of the enterprise. When the terminal moves out of coverage of the network slice, the terminal initiates a periodic registration procedure, and allowed-NSSAI returned by a network side does not include S-NSSAI corresponding to the network slice of the network of the enterprise. In this case, no application previously associated with the network slice can be used. Therefore, the terminal may display a display interface corresponding to the network slice of the network of the enterprise as an invalid state, to inform a user that an APP installed on the display interface corresponding to a split screen cannot be used temporarily.

Further, for example, before the terminal moves, allowed-NSSAI returned by a network includes these three different network slice types: S-NSSAI-1, S-NSSAI-2, and S-NSSAI-3. Based on service feature information of these three network slice types, the terminal may dynamically generate a mapping table between each application and a slice type. For the mapping table, refer to Table 4. Certainly, the mapping table may alternatively be represented in a format of Table 2.

TABLE 4

| Youku video and Sohu video | S-NSSAI-1 |
| QQ and WeChat | S-NSSAI-2 |
| W3 and ESPACE | S-NSSAI-3 |

The S-NSSAI-3 is an identifier of a network slice corresponding to a network of an enterprise. When the terminal moves out of coverage of the network of the enterprise, the terminal initiates a periodic registration procedure, and allowed-NSSAI returned by a network side includes only the S-NSSAI-1 and the S-NSSAI-2, and does not include the S-NSSAI-3 of the network slice that can provide a service on the network side before the movement. In this case, no application associated with the S-NSSAI-3 can be used in a new location area. That is, the applications: W3 and ESPACE, cannot be used.

The application scenario 3 may be further used as a special scenario in which national security information is protected (for example, a scenario in which an employee or a policeman/policewoman that works in enterprises and public institutions related to national secrets, such as public security, installs, on a terminal, an application that can be used by only an internal employee, and has permission to access, by using the application in only an office area, a network slice for accessing a public security system). When the policeman/policewoman is off duty or leaves out of the office area, the policeman/policewoman loses permission to access the public security system by using the application, thereby ensuring information security of the public security system.

The method described above has a very high limitation on a location and mobility of a user, and is merely used as an example. If the user moves out of a service area of a network slice, whether the user can continue to use an application associated with the network slice may be determined based on a requirement of the application on information security or a current location of the terminal.

Specifically, if an application does not have a strict requirement on information security or a current location of the terminal, in a new location area, the terminal may automatically migrate applications (the applications W3 and ESPACE) associated with the S-NSSAI-3 to a display interface corresponding to another slice, for example, a display split screen corresponding to the S-NSSAI-2; or the terminal receives a reassociation operation of the user, where the reassociation operation is dragging the applications W3 and ESPACE to a split screen corresponding to another network slice, to update a network slice selection policy locally stored in the terminal, as shown in Table 5.

TABLE 5

| Youku video and Sohu video | S-NSSAI-1 |
| QQ, WeChat, W3, and ESPACE | S-NSSAI-2 |

As another example, when the terminal moves to a remote mountainous area or an area with slightly poor mobile network signal coverage, some network slices may not be deployed in the area, and consequently, no application previously associated with the network slices can be used. After the terminal moves out of a service area of a network slice, the terminal initiates a periodic registration procedure, and allowed-NSSAI returned by a network does not include S-NSSAI corresponding to the network slice. Optionally, the terminal may automatically delete a split screen corresponding to the network slice, and automatically migrate an application previously associated with the network slice to a display interface corresponding to another network slice or a default network slice type. Alternatively, optionally, the terminal receives a reassociation operation of the user, that is, the user drags the application associated with the network slice to another split screen, to update a locally stored network slice selection policy.

In this way, after the application is reassociated with a new network slice, when the user initiates a session request for the application again, the terminal initiates a registration procedure to the new network slice, to request to use the new network slice to provide a service for the application.

Application Scenario 4

After the terminal generates, by using the method in the application scenario 1 or the application scenario 2, a network slice selection policy that includes a mapping relationship between each application and a network slice identifier, the terminal adds a slice management interface to the display interface, the terminal displays, on the slice management interface, a slice type of a network slice that can provide a service on a network side in a PLMN in which the terminal is currently located, and a user may set a priority of each network slice based on a usage status of the terminal, and may further set resource allocation rates of different network slices, to implement slice type-based resource scheduling of network slices with different priorities, and provide differentiated resource configurations.

Figure 10:
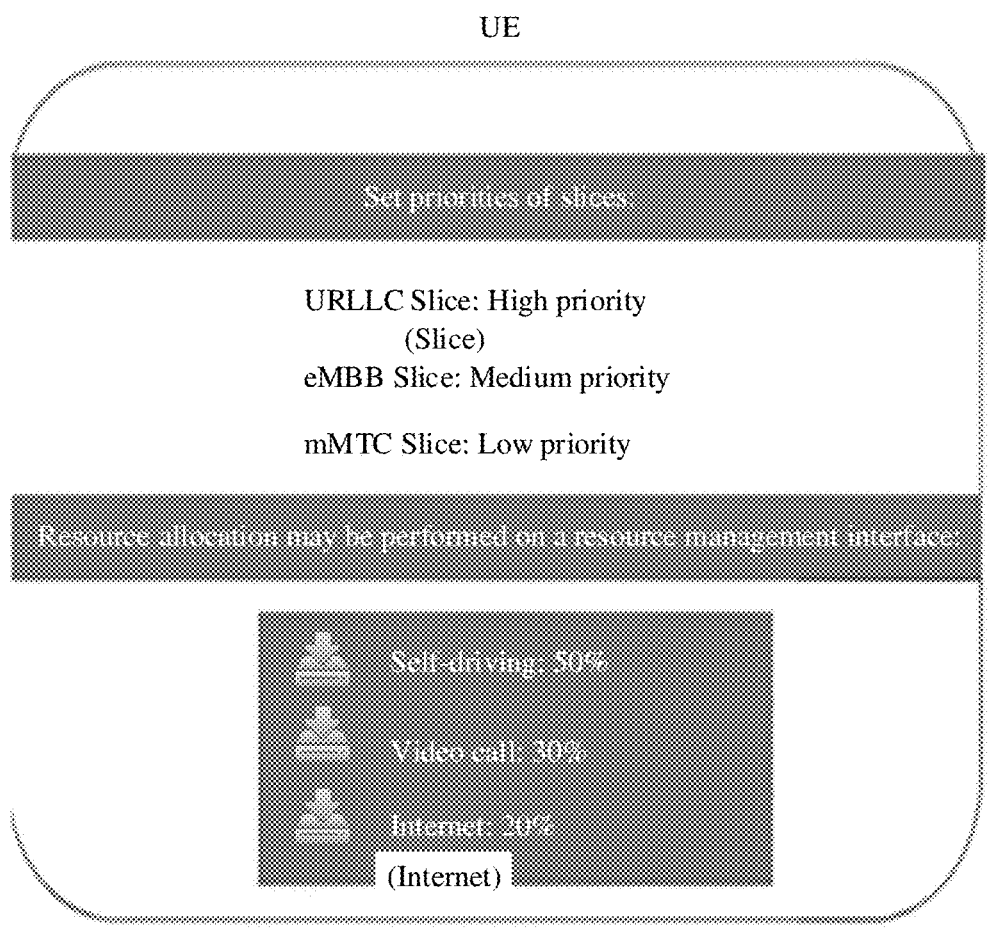
FIG. 10 is a schematic diagram of display of a slice management interface in an application scenario 4 according to an embodiment of this application.

For example, as shown in FIG. 10, a terminal currently accesses three different types of network slices, namely, a low-latency and high-reliable connection (URLLC) slice, an enhanced mobile broadband (eMBB) slice, and a large-scale internet of things (mMTC) slice. The terminal provides, for a user, a function of setting priorities of different network slices on the slice management interface, to help the user perform priority management. For example, a URLLC slice has a high priority; an eMBB slice has a medium priority; and an mMTC slice has a low priority.

When a plurality of session tasks exist on different network slices, resource scheduling and allocation may be performed for each network slice. For example, in FIG. 10, a self-driving service is used on a URLLC slice, a video call service is used on an eMBB slice, and an Internet service is used on an mMTC slice. The user allocates an available resource of 50% to the URLLC slice, allocates an available resource of 30% to the eMBB slice, and allocates an available resource of 20% to the mMTC slice.

In this application scenario, the slice management interface is added to the display interface of the terminal, and the terminal may set a priority of each network slice based on a usage status of the terminal, and may set resource allocation statuses of different network slices, to implement slice type-based priority resource scheduling, and provide differentiated resource configurations.

Application Scenario 5

Figure 11:
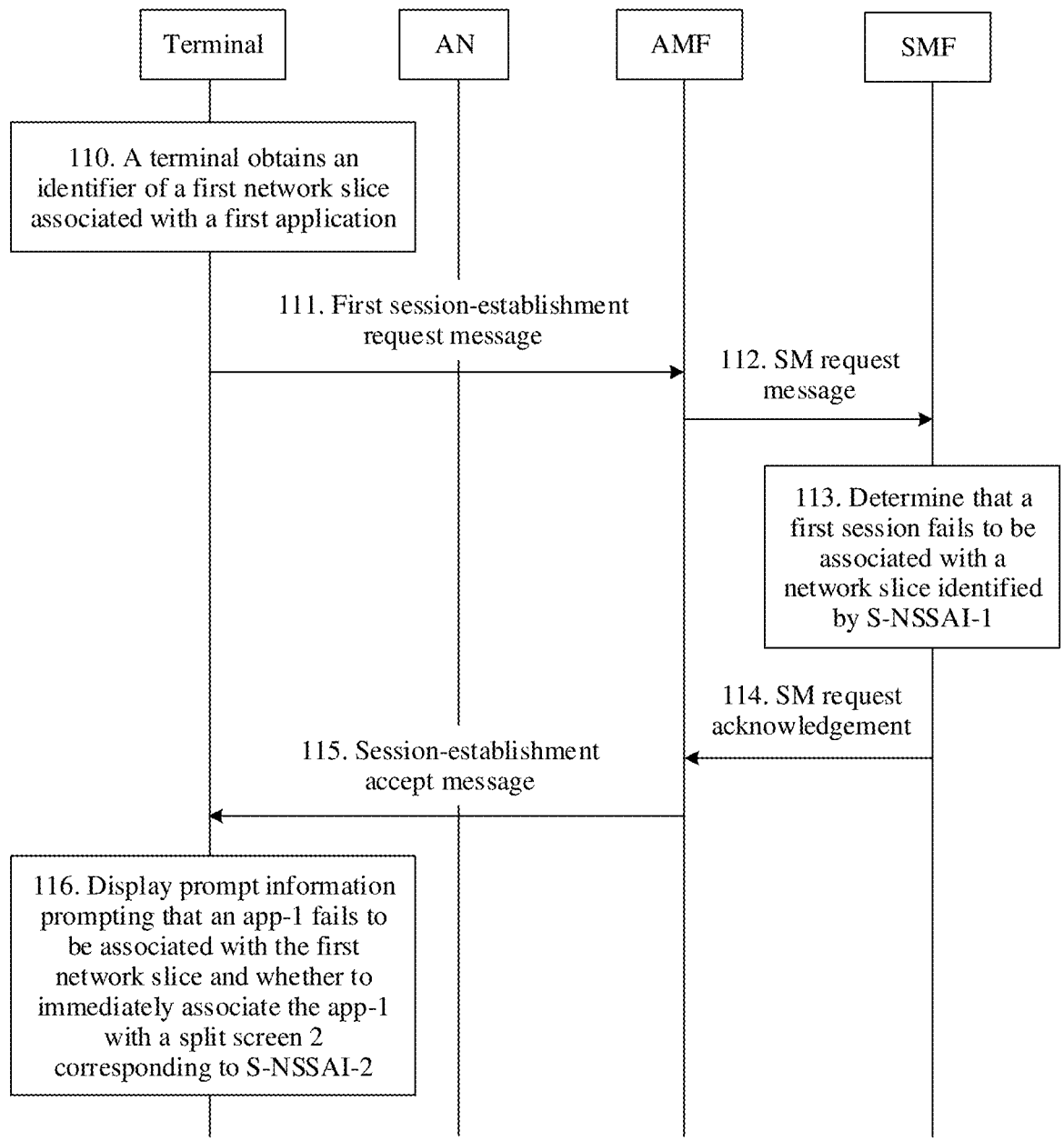
FIG. 11 is a flowchart of a method for associating an application with a suggested network slice in an application scenario 5 according to an embodiment of this application.

In some actual application scenarios, a user may perform a misoperation, or incorrectly associate with an application with a network slice. After the user associates an application with a network slice type, the terminal sends a session-establishment request message to a network side for the application. The network side determines, based on S-NSSAI-1 added by the terminal, a data network name (DNN), and subscription data of the terminal, whether a session can be normally established. If the session associated with the application fails to be established, the network side returns an identifier of a suggested network slice and reassociation instruction information, where the reassociation instruction information is used to instruct the terminal to inform the user that the application should be associated with the suggested network slice. For a specific procedure, refer to FIG. 11.

Step 110: The terminal obtains an identifier of a first network slice associated with a first application.

For example, the terminal performs split-screen display, based on allowed NSSAI returned by the network side in a registration procedure, on feature information of a network slice that can be accessed by the terminal in a current PLMN. For specific implementation, refer to the application scenario 1 and the application scenario 2. The terminal learns, based on a result of the split-screen display and an association operation of a user, that an APP-1 and S-NSSAI-1 are associated together, that is, an icon of the APP-1 is displayed on a split screen corresponding to the S-NSSAI-1. The first application is represented by the APP-1, and the identifier of the first network slice is represented by the slice type S-NSSAI-1.

Step 111: The terminal initiates a first session-establishment request message of the first application to the AMF through an AN, where the first session-establishment request message carries a first session identifier (PDU session ID) allocated to a first session, a data network name (DNN), and the slice type S-NSSAI-1 associated with the application.

Step 112: After receiving the first session-establishment request message of the terminal, the AMF selects an SMF network element based on the S-NSSAI-1. The SMF network element belongs to the network slice corresponding to the S-NSSAI-1. The AMF sends an SM request message to the SMF network element. The SM request message carries a permanent identifier of the terminal, the first session identifier corresponding to the first session, and the S-NSSAI-1.

Step 113: The SMF determines, based on subscription information of the terminal, that the first session fails to be associated with the network slice identified by the S-NSSAI-1.

For example, the SMF checks the subscription information of the terminal. If the subscription information of the terminal does not include the S-NSSAI-1, and the SMF determines that the first session cannot be associated with the network slice identified by the S-NSSAI-1, the SMF determines that the first session fails to be associated with the network slice identified by the S-NSSAI-1.

Step 114: The SMF returns an SM request acknowledgement to the AMF, where the SM request acknowledgement carries the permanent identifier of the terminal, a cause value, S-NSSAI-2, and reassociation instruction information. The cause value is used to indicate to the terminal that the first application fails to be associated with the first network slice, and the reassociation instruction information is used to instruct the terminal to inform the user that the first session should be reassociated with the network slice identified by the S-NSSAI-2.

The subscription information of the terminal includes the identifier of the reassociated network slice. Therefore, the SM request acknowledgement returned by the SMF also needs to carry the identifier of the reassociated network slice. Herein, the identifier of the reassociated network slice is indicated by a type of the reassociated network slice, namely, the S-NSSAI-2.

Step 115: The AMF returns a session-establishment accept message, the S-NSSAI-2, and the reassociation instruction information to the terminal.

Optionally, the session-establishment accept message may further carry the cause value.

The cause value is used to indicate to the terminal that the first application fails to be associated with the first network slice.

It should be noted that, as shown in FIG. 2, the SMF and the AMF in this embodiment may be independently disposed as different network elements, or may be integrated into a same network element to implement respective functions. In this case, execution processes of the AMF and the SMF in the foregoing steps are all performed by the integrated network element.

Step 116: After receiving the reassociation instruction information returned by the AMF, the terminal displays, on a display interface, prompt information prompting that the APP-1 fails to be associated with the first network slice and whether to immediately associate the APP-1 with a split screen 2 corresponding to the S-NSSAI-2. For details, refer to FIG. 12.

Figure 12:
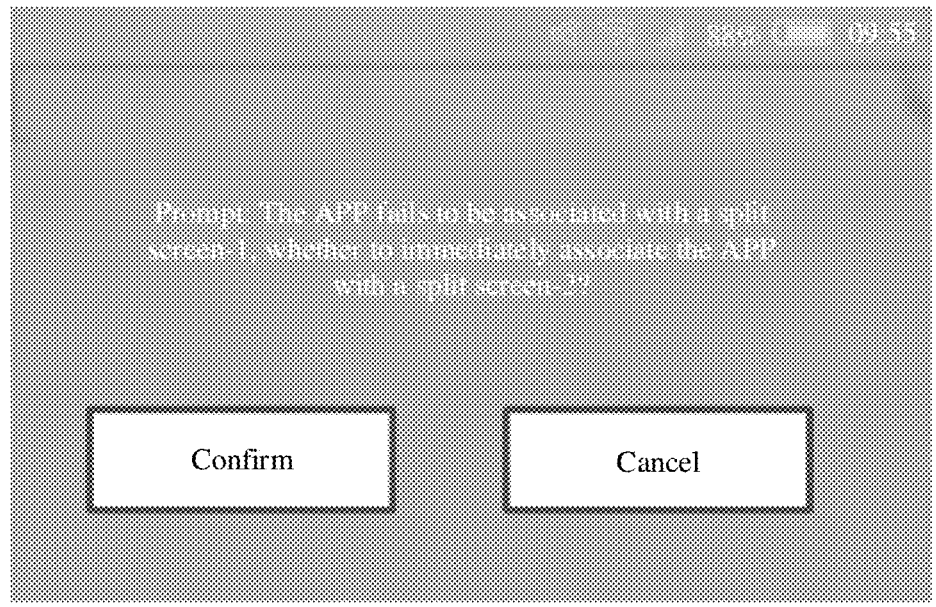
FIG. 12 is a schematic diagram of display of prompt information prompting to associate an application with a suggested network slice in the application scenario 5 according to an embodiment of this application.

Further, if the user drags, based on the prompt information in FIG. 12, the APP-1 to the split screen 2 corresponding to the S-NSSAI-2, when the user taps the APP-1 on the split screen 2, and the terminal initiates a session-establishment request again, namely, a second session-establishment request, a process of establishing a second session is normally performed on a network side, and the APP-1 may be normally used on the split screen 2.

If the user does not perform an operation based on the prompt information, and still leaves the APP-1 on a split screen 1 corresponding to the S-NSSAI-1, when the user taps the APP-1 on the split screen 1, an operating system pops up a prompt window shown in FIG. 12 again, to prompt that the APP-1 should be used on the network slice corresponding to the S-NSSAI-2. In this case, the terminal does not need to initiate a second session-establishment request until the APP-1 is dragged to the split screen 2 corresponding to the S-NSSAI-2.

The foregoing method is used, to resolve a problem that an application cannot be normally used due to a misoperation of a user or that an application is incorrectly associated with a network slice.

Based on a same concept, this application further provides an apparatus for associating an application with a network slice. The apparatus may be configured to perform the steps performed by the terminal in FIG. 3, FIG. 4, FIG. 8, and FIG. 11. Therefore, for an implementation of the apparatus for associating an application with a network slice provided in this embodiment of this application, refer to the implementation of the foregoing method.

Figure 13:
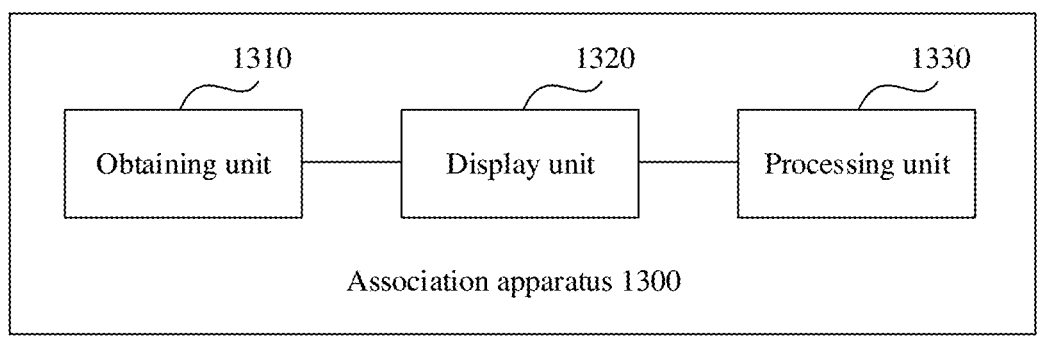
FIG. 13 is a structural diagram of an apparatus for associating an application with a network slice according to an embodiment of this application.

For example, referring to FIG. 13, an embodiment of this application provides an apparatus 1300 for associating an application with a network slice. The apparatus 1300 is applied to a terminal, and includes:

an obtaining unit 1310, configured to obtain display instruction information, an identifier of a first network slice that the terminal is allowed to access, and service feature information corresponding to the first network slice;

a display unit 1320, configured to display the service feature information corresponding to the first network slice on a first display interface of the terminal based on the display instruction information; and a processing unit 1330, configured to generate a first network slice selection policy when an operation of associating a first application with the first display interface is detected, where the first network slice selection policy includes a mapping relationship between the first application and the identifier of the first network slice corresponding to the first display interface.

In a possible implementation, when obtaining the service feature information corresponding to the first network slice, the obtaining unit 1310 is specifically configured to:

receive the service feature information from a network side in a registration process of the terminal.

In a possible implementation, when obtaining the service feature information corresponding to the first network slice, the obtaining unit 1310 is specifically configured to:

receive the identifier of the first network slice from a network side in a registration process of the terminal; and obtain, based on a mapping relationship that is between a network slice and service feature information and that is pre-configured by the terminal, and the identifier of the first network slice, the service feature information corresponding to the first network slice.

In a possible implementation, the obtaining unit 1310 is further configured to:

receive the display instruction information from the network side in the registration process of the terminal, where the display instruction information is used to instruct the display unit 1320 to display the service feature information corresponding to the first network slice on the first display interface.

In a possible implementation, the display unit 1320 is further configured to:

display the first display interface as an unavailable state when the first network slice cannot provide a service.

In a possible implementation, the obtaining unit 1310 is further configured to:

obtain an identifier of a second network slice that the terminal is allowed to access and service feature information corresponding to the second network slice;

the display unit 1320 is further configured to display the service feature information corresponding to the second network slice on a second display interface of the terminal based on the display instruction information; and the generation unit is further configured to generate a second network slice selection policy when an operation of associating the first application with the second display interface is detected, where the second network slice selection policy includes a mapping relationship between the first application and the identifier of the second network slice.

In a possible implementation, the display unit 1320 is further configured to:

display slice management information on a third display interface of the terminal after the terminal performs registration, where the third display interface is used to perform a management operation on a network slice; and when the terminal accesses the first network slice, the third display interface displays a priority of the first network slice and a resource allocation status of the first network slice.

In a possible implementation, the obtaining unit 1310 is further configured to:

send a first session-establishment request message for the first application to the network side, where the first session-establishment request message carries the identifier of the first network slice; and receive a session accept message from the network side, where the session accept message includes an identifier of a third network slice and reassociation instruction information, and the reassociation instruction information is used to instruct the terminal to display prompt information prompting to associate the first application with the third network slice.

In a possible implementation, the session accept message includes a cause value; and the cause value is used to indicate to the terminal that the first application fails to be associated with the first network slice.

Based on a same concept, this application further provides a terminal. The terminal may be configured to perform the steps performed by the terminal in FIG. 2. Therefore, for an implementation of the terminal provided in this embodiment of this application, refer to the implementation of the foregoing method, and details are not repeatedly described. For a hardware implementation of the terminal, refer to FIG. 1 and related descriptions thereof.

Based on the foregoing embodiment, this application further provides an apparatus for associating an application with a network slice. The apparatus may be configured to perform the steps performed by the SMF and the AMF in FIG. 11. Therefore, for an implementation of the apparatus for associating an application with a network slice provided in this embodiment of this application, refer to the implementation of the foregoing method.

Figure 14:
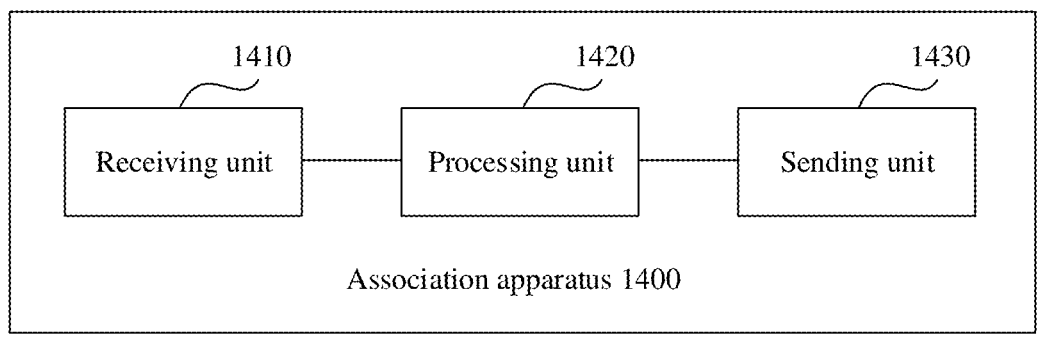
FIG. 14 is a structural diagram of an apparatus for associating an application with a network slice according to an embodiment of this application.

For example, referring to FIG. 14, an embodiment of this application provides an apparatus 1400 for associating an application with a network slice. The apparatus 1400 is applied to a network device, and includes:

a receiving unit 1410, configured to receive a first session-establishment request message for a first application from a terminal, where the first session-establishment request message carries an identifier of a first network slice;

a processing unit 1420, configured to determine that the first application fails to be associated with the first network slice; and a sending unit 1430, configured to send a session accept message to the terminal, where the session accept message includes an identifier of a third network slice and reassociation instruction information, and the reassociation instruction information is used to instruct the terminal to display prompt information prompting to associate the first application with the third network slice.

In a possible implementation, after the sending unit 1430 sends the session accept message to the terminal, the receiving unit 1410 is further configured to:

receive a second session-establishment request message sent by the terminal, where the second session-establishment request message carries the identifier of the third network slice.

In a possible implementation, when determining that the first application fails to be associated with the first network slice, the processing unit 1420 is specifically configured to:

obtain subscription information of the terminal after the receiving unit 1410 receives the first session-establishment request message, where the subscription information of the terminal does not include the identifier of the first network slice.

In a possible implementation, the session accept message includes a cause value; and the cause value is used to indicate to the terminal that the first application fails to be associated with the first network slice.

In a possible implementation, the subscription information of the terminal includes the identifier of the third network slice.

Based on a same concept, this application further provides a network device. The network device may be configured to perform the steps performed by the SMF and the AMF in FIG. 11. Therefore, for an implementation of the network device provided in this embodiment of this application, refer to the implementation of the foregoing method, and details are not repeatedly described.

Figure 15:
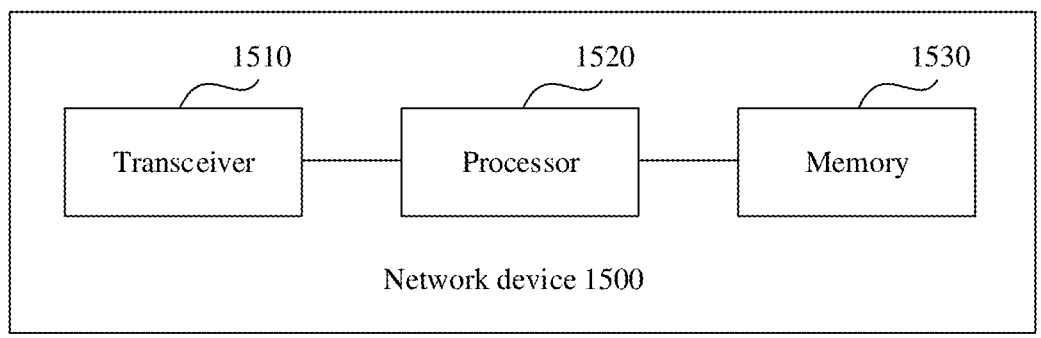
FIG. 15 is a structural diagram of a network device according to an embodiment of this application.

Referring to FIG. 15, an embodiment of this application provides a network device 1500. The network device includes a transceiver 1510, a processor 1520, and a memory 1530. The transceiver 1510, the processor 1520, and the memory 1530 may be connected by using a bus system. The memory 1530 is configured to store a program, an instruction, or code, and the processor 1520 is configured to execute the program, the instruction, or the code in the memory 1530. As a specific example, the processor can: receive a first session-establishment request message for a first application from a terminal, where the first session-establishment request message carries an identifier of a first network slice; determine that the first application fails to be associated with the first network slice; and send a session accept message to the terminal, where the session accept message includes an identifier of a third network slice and reassociation instruction information, where the reassociation instruction information is used to instruct the terminal to display prompt information prompting to associate the first application with the third network slice.

It should be noted that in a specific implementation, functions of the receiving unit 1410 and the sending unit 1430 in FIG. 14 may be implemented by using the transceiver 1510 in FIG. 15, and a function of the processing unit 1420 in FIG. 14 may be implemented by using the processor 1520 in FIG. 15.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a magnetic disk storage, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

Obviously, a person skilled in the art can make various modifications and variations to embodiments of this application without departing from the spirit and scope of this application. This application is intended to cover these modifications and variations in the embodiments of this application provided that these modifications and variations fall within the scope of the claims and their equivalent technologies in this application.

What is claimed is:

1. A method for associating an application with a network slice, comprising:
   obtaining, by a terminal, display instruction information, an identifier of a first network slice that the terminal is allowed to access, and service feature information corresponding to the first network slice;
   displaying, by the terminal, the service feature information corresponding to the first network slice on a first display interface of the terminal based on the display instruction information; and
   generating, by the terminal, a first network slice selection policy when detecting an operation of associating a first application with the first display interface, wherein the first network slice selection policy comprises a mapping relationship between the first application and the identifier of the first network slice corresponding to the first display interface, wherein
   obtaining the service feature information comprises:
      receiving, by the terminal, the service feature information from a network side in a registration process of the terminal; and
      receiving, by the terminal, the display instruction information from the network side in the registration process of the terminal, wherein the display instruction information is used to instruct the terminal to display the service feature information corresponding to the first network slice on the first display interface.

2. The method according to claim 1, wherein obtaining the service feature information comprises:
   receiving, by the terminal, the identifier of the first network slice from the network side in the registration process of the terminal; and
   obtaining the service feature information, by the terminal, based on the identifier of the first network slice and a mapping relationship between a network slice, preconfigured by the terminal, and service feature information, pre-configured by the terminal.

3. The method according to claim 2, further comprising:
   receiving, by the terminal, the display instruction information from the network side in the registration process of the terminal, wherein the display instruction information is used to instruct the terminal to display the service feature information corresponding to the first network slice on the first display interface.

4. The method according to claim 1, further comprising:
   displaying, by the terminal, the first display interface as an unavailable state when the first network slice is unable to provide a service.

5. The method according to claim 4, further comprising:
   obtaining, by the terminal, an identifier of a second network slice that the terminal is allowed to access and service feature information corresponding to the second network slice;
   displaying, by the terminal, the service feature information corresponding to the second network slice on a second display interface of the terminal based on the display instruction information; and
   generating, by the terminal, a second network slice selection policy when detecting an operation of associating the first application with the second display interface, wherein the second network slice selection policy comprises a mapping relationship between the first application and the identifier of the second network slice.

6. The method according to claim 1, further comprising:
   displaying, by the terminal after performing a registration process, slice management information on a second display interface of the terminal, wherein the second display interface is used by the terminal to perform a management operation on a network slice; and when the terminal accesses the first network slice, the second display interface displays a priority of the first network slice and a resource allocation status of the first network slice.

7. The method according to claim 1, further comprising:
   sending, by the terminal, a first session-establishment request message for the first application to the network side, wherein the first session-establishment request message carries the identifier of the first network slice; and
   receiving, by the terminal, a session accept message from the network side, wherein the session accept message comprises an identifier of a second network slice and reassociation instruction information, and the reassociation instruction information is used to instruct the terminal to display prompt information prompting to associate the first application with the second network slice.

8. The method according to claim 7, wherein the session accept message comprises a cause value; and the cause value is used to indicate to the terminal that the first application fails to be associated with the first network slice.

9. The method according to claim 1, wherein
   the service feature information includes any of a service provider of the first network slice and a speed associated with the service provider of the first network slice, and
   the service feature information further includes character string prompt information associated with the first network slice indicating a type of application suitable for the first network slice.

10. The method according to claim 1, wherein a plurality of applications stored in the terminal are associated with a plurality of network slices, and the first display interface is configured to enable selection of a network slice, from the plurality of network slices, in association with a type of application from the plurality of applications stored in the terminal.

11. An information processing apparatus including, at least, a terminal and configured to associate an application with a network slice, the information processing apparatus comprising:
   a processor configured to obtain display instruction information, an identifier of a first network slice that the terminal is allowed to access, and service feature information corresponding to the first network slice; and
   a display configured to display the service feature information corresponding to the first network slice on a first display interface of the terminal based on the display instruction information,
   wherein the processor is further configured to generate a first network slice selection policy when an operation of associating a first application with the first display interface is detected, wherein the first network slice selection policy comprises a mapping relationship between the first application and the identifier of the first network slice corresponding to the first display interface, and wherein obtaining the service feature information comprises:
- receiving the service feature information from a network side in a registration process of the terminal; and
- receiving the display instruction information from the network side in the registration process of the terminal, wherein the display instruction information is used to instruct the terminal to display the service feature information corresponding to the first network slice on the first display interface.

12. The information processing apparatus according to claim 11, wherein the processor is further configured to:
- receive the identifier of the first network slice from the network side in the registration process of the terminal; and
- obtain the service feature information based on the identifier of the first network slice and a mapping relationship between a network slice, preconfigured by the terminal, and service feature information, pre-configured by the terminal.

13. The information processing apparatus according to claim 12, wherein the processor is further configured to:
- receive the display instruction information from the network side in the registration process of the terminal, wherein the display instruction information is used to instruct the display to display the service feature information corresponding to the first network slice on the first display interface.

14. The information processing apparatus according to claim 11, wherein the display is further configured to:
- display the first display interface as an unavailable state when the first network slice is unable to provide a service, and wherein
- the processor is further configured to obtain an identifier of a second network slice that the terminal is allowed to access and service feature information corresponding to the second network slice;
- the display is further configured to display the service feature information corresponding to the second network slice on a second display interface of the terminal based on the display instruction information; and
- the processor is further configured to generate a second network slice selection policy when an operation of associating the first application with the second display interface is detected, wherein the second network slice selection policy comprises a mapping relationship between the first application and the identifier of the second network slice.

15. The information processing apparatus according to claim 11, wherein the display is further configured to:
- display slice management information on a second display interface of the terminal after the terminal performs registration, wherein the second display interface is used to perform a management operation on a network slice; and when the terminal accesses the first network slice, the second display interface displays a priority of the first network slice and a resource allocation status of the first network slice.

16. The information processing apparatus according to claim 11, wherein the processor is further configured to:
- send a first session-establishment request message for the first application to the network side, wherein the first session-establishment request message carries the identifier of the first network slice; and
- receive a session accept message from the network side, wherein the session accept message comprises an identifier of a second network slice and reassociation instruction information, and the reassociation instruction information is used to instruct the terminal to display prompt information prompting to associate the first application with the second network slice.

17. The information processing apparatus according to claim 16, wherein the session accept message comprises a cause value; and the cause value is used to indicate to the terminal that the first application fails to be associated with the first network slice.

* * * * *